United States Patent
Ogawa et al.

(10) Patent No.: US 8,414,441 B2
(45) Date of Patent: Apr. 9, 2013

(54) SPEED CHANGE CONTROL SYSTEM FOR TRANSMISSION OF VEHICLE

(75) Inventors: Hiroyuki Ogawa, Susono (JP); Akira Murakami, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/056,373

(22) PCT Filed: Apr. 23, 2009

(86) PCT No.: PCT/JP2009/058048
§ 371 (c)(1),
(2), (4) Date: Mar. 14, 2011

(87) PCT Pub. No.: WO2010/122646
PCT Pub. Date: Oct. 28, 2010

(65) Prior Publication Data
US 2012/0035015 A1    Feb. 9, 2012

(51) Int. Cl.
*F16H 13/08* (2006.01)
*F16H 3/72* (2006.01)

(52) U.S. Cl.
USPC .......................................... 475/196; 475/209

(58) Field of Classification Search .................. 475/196, 475/197, 207, 209, 302; 476/59, 60, 36, 476/38
See application file for complete search history.

(56) References Cited

U.S. PATENT DOCUMENTS 7,086,981 B2 * 8/2006 Ali et al. ........................ 475/210
7,654,928 B2 * 2/2010 Miller et al. ................... 475/189
8,292,772 B2 * 10/2012 Greenwood ................... 475/192
2003/0069103 A1 4/2003 Ibamoto et al.
2003/0176254 A1 * 9/2003 Elser et al. ...................... 476/40
2004/0077448 A1 4/2004 Oshidari et al.
2004/0171452 A1 9/2004 Miller et al.
2005/0272555 A1 12/2005 Tabata et al.
2007/0144288 A1 6/2007 Ozaki et al.
2011/0319222 A1 * 12/2011 Ogawa et al. ................... 476/55

FOREIGN PATENT DOCUMENTS

| DE | 196 29 213 A1 | 1/1998 |
| DE | 10 2005 025 654 A1 | 3/2006 |
| JP | B1-41-17403 | 10/1966 |
| JP | A-6-257655 | 9/1994 |

(Continued)

OTHER PUBLICATIONS

International Search Report for International Patent Application No. PCT/JP2009/058048, mailed on Aug. 4, 2009 (w/ English translation).

*Primary Examiner* — Roger Pang
(74) *Attorney, Agent, or Firm* — Oliff & Berridge, PLC

(57) ABSTRACT

To provide a control system for carrying out a speed change operation of a geared transmission mechanism continuously by controlling a continuously variable transmission mechanism.
A continuously variable transmission mechanism configured to increase and decrease speeds of a first and a second output discs simultaneously, and a geared transmission mechanism configured to change a speed change ratio stepwise are connected in series. The output discs are connected individually with intermediate shafts. The control system is adapted to synchronize a rotational speed of a switching mechanism and a rotational speed of a member to be engaged with the switching mechanism, by tilting a rolling member when carrying out a speed change in the geared transmission mechanism thereby increasing a rotational speed of one of the intermediate shaft while decreasing a rotational speed of the other intermediate shaft (at steps S3, S4 and S5).

13 Claims, 17 Drawing Sheets

FOREIGN PATENT DOCUMENTS

| | | |
|---|---|---|
| JP | A-2003-113934 | 4/2003 |
| JP | A-2004-150627 | 5/2004 |
| JP | A-2005-163856 | 6/2005 |
| JP | A-2006-519349 | 8/2006 |
| JP | A-2007-177925 | 7/2007 |

* cited by examiner (a)

(b)

SPEED CHANGE CONTROL SYSTEM FOR TRANSMISSION OF VEHICLE

TECHNICAL FIELD

This invention relates to a system for controlling a speed change ratio of a transmission of a vehicle, and especially to a system for controlling a speed change ratio of a transmission structured by combining a continuously variable transmission mechanism and a geared transmission mechanism.

BACKGROUND ART

A transmission, in which a geared transmission unit comprising gear pairs, and a switching mechanism selectively allowing and disabling the gear pairs to transmit a torque between an input shaft and an output shaft, is connected in series with a mechanism capable of varying a speed change ratio thereof continuously is known in the prior art. For example, the transmission of this kind is disclosed in Japanese Patent Laid-Open No. 2007-177925 and Japanese Patent Laid-Open No. 2003-113934. Specifically, according to the transmission taught by the above-listed documents, gear pairs for setting gear stages are arranged on two intermediate shafts and an output shaft, and a differential mechanism having a motor therein is arranged between the intermediate shafts. If a speed change operation is carried out in the transmission thus structured by merely switching the gear pair for transmitting the torque, the speed change ratio has to be changed stepwise. Therefore, according to the teachings of the above-mentioned documents, rotational speeds of members to be connected with each other by a switching mechanism are almost synchronized with each other when carrying out a speed change operation, by varying the rotational speed of the gear pair to transmit the torque after the speed change using the motor. Consequently, the speed change ratio can be varied smoothly.

Another example of the transmission of this kind is disclosed in Japanese Patent Laid-Open No. 2004-150627. According to the hybrid transmission taught by Japanese Patent Laid-Open No. 2004-150627, a gear mechanism is formed by a plurality of planetary gear mechanisms, and the gear mechanism is configured to set a plurality of gear stages by connecting rotational elements of the planetary gear mechanisms, by changing connections of the rotational elements, and by selectively halting the rotational elements. In addition, a planetary gear type power splitting mechanism adapted to distribute a power of an engine to a motor and to the gear mechanism is arranged in an input side of the aforementioned gear mechanism. Therefore, the hybrid transmission taught by Japanese Patent Laid-Open No. 2004-150627 is capable of varying an input speed of the geared transmission mechanism arbitrarily by controlling a speed of the motor. For this reason, the hybrid transmission taught by Japanese Patent Laid-Open No. 2004-150627 is capable of carrying out a so-called "synchronous control" by the motor on the occasion of carrying out a speed change by the geared transmission mechanism.

In addition, an example of a mechanism capable of varying a speed change ratio continuously is disclosed in Japanese Patent Laid-Open No. 6-257655. The mechanism taught by Japanese Patent Laid-Open No. 6-257655 comprises a ball contacted with an outer face of a V-pulley, and first and second rotation means whose inverted conical surfaces are contacted with the ball to hold the ball. According to teachings of Japanese Patent Laid-Open No. 6-257655, a speed change ratio is varied by axially moving the V-pulley functioning as a driving member, one of the rotation means being idled, and the other rotation means functioning as an output member, thereby changing contact points between those members and the ball.

Thus, according to the transmissions taught by Japanese Patent Laid-Open No. 2007-177925, Japanese Patent Laid-Open No. 2003-113934, and Japanese Patent Laid-Open No. 2004-150627, the speed change operation of the geared transmission mechanism is carried out stepwise. However, the transmissions taught by the above-mentioned documents are capable of setting a speed change ratio between the gear stages of the geared transmission mechanism by controlling the motor while synchronizing rotational speeds during the speed change operation. Therefore, those transmissions are capable of carrying out the speed change operation smoothly, that is, capable of carrying out the speed change operation substantially continuously. However, according to the transmissions taught by the above-mentioned documents, the rotational speeds are controlled by the motor to be synchronized. That is, the motor is required other than the engine. Therefore, the transmission has to be enlarged entirely, and energy efficiency thereof may be deteriorated.

Meanwhile, the mechanism taught by Japanese Patent Laid-Open No. 6-257655 is capable of varying a ratio between a rotational speed of the input member and a rotational speed of the output member continuously. However, V-pulley and the rotation means have to be moved in the axial direction for this purpose, and a specific control is required to thus carry out a speed change operation. Therefore, devices applicable to the mechanism taught by Japanese Patent Laid-Open No. 6-257655 have to be limited. In addition, one of the rotation means has to be idled, therefore, the mechanism taught by Japanese Patent Laid-Open No. 6-257655 cannot be configured as a transmission comprising three rotary elements.

DISCLOSURE OF THE INVENTION

The present invention has been conceived noting the technical problems thus far described, and its object is to provide a compact apparatus, which is capable of carrying out a speed change operation of a geared transmission mechanism continuously by synchronizing rotational speeds to smoothen the ongoing speed change operation.

In order to achieve the above-mentioned object, according to the present invention, there is provided a speed change control system for a transmission of a vehicle, in which a continuously variable transmission mechanism configured to vary a speed change ratio continuously and a geared transmission mechanism configured to change a speed change ratio stepwise are connected in series. According to the present invention, the continuously variable transmission mechanism comprises: a first rotary member which rotates around a center axis; a rolling member having a smooth outer face, which is contacted with an outer circumferential face of the first rotary member in a manner to transmit a torque therebetween and in a manner to tilt a rotational center axis thereof; and a second rotary member and a third rotary member, which are contacted with the outer face of the rolling member in a torque transmittable manner at a side opposite to a side to which the first rotary member is contacted across the rotational center axis of the rolling member, and which are adapted to rotate relatively with the first rotary member. Meanwhile, the geared transmission comprises: a first intermediate shaft connected with the second rotary member; a second intermediate shaft connected with the third rotary member; an output member, which is connected selectively with the first intermediate shaft and the second intermediate shaft in a torque transmittable manner; a first transmission mechanism, which is arranged between the first intermediate shaft and the output member, and which is adapted to set a ratio between rotational speeds of the first intermediate shaft and the output member to a predetermined ratio; a first switching mechanism, which is adapted to allow and to disable the first transmission mechanism to transmit the torque selectively; a second transmission mechanism, which is arranged between the second intermediate shaft and the output member, and which is adapted to set a ratio between rotational speeds of the second intermediate shaft and the output member to a ratio different from the ratio set by the first transmission mechanism; and a second switching mechanism, which is adapted to allow and to disable the second transmission mechanism to transmit the torque selectively. According to the present invention, the speed change control system further comprises: a synchronization command means, which is adapted to tilt a rotational center axis of the rolling member, thereby synchronizing a rotational speed of one of the first and the second switching mechanism with a rotational speed of a member to be engaged therewith, when carrying out a speed change operation by engaging said one of the switching mechanisms being disengaged with the member to be engaged therewith; and a speed change execution means, which is adapted to shift said one of the switching mechanisms thereby engaging said one of the switching mechanisms with the member to be engaged therewith, when a difference between the rotational speed of said one of the switching mechanisms and the rotational speed of the member to be engaged therewith becomes smaller than a preset value.

The speed change control system of the present invention further comprises: a returning means, which is adapted to return the rotational center axis of the rolling member to a condition in which the rotational speed of the second rolling member and the rotational speed of the third rotary member are equalized, after said one of the switching mechanisms is engaged with the member to be engaged.

The speed change control system of the present invention further comprises: a speed change command means, which is adapted to output a command value for setting a speed change ratio in the transmission; and a neutral command means, which is adapted to set the rotational center axis of the rolling member to a condition in which the rotational speed of the second rolling member and the rotational speed of the third rotary member are equalized, in case the speed change ratio commanded by the speed change command means can be set by the first transmission mechanism or the second transmission mechanism.

The speed change control system of the present invention further comprises: a tilt angle control means, which is adapted to increase a tilt angle of the rotational center axis of the rolling member until said difference in the rotational speeds becomes smaller than the preset value, and to decrease the tilt angle of the rotational center axis of the rolling member after said difference in the rotational speeds becomes smaller than the preset value.

In addition to above, the speed change control system of the present invention further comprises: a synchronous speed control means, which is adapted to change a change rate of a speed change ratio achieved by tilting the rotational center axis of the rolling member in a manner to reduce said difference in the rotational speeds smaller than the preset value, depending on the situations just after the rotational center axis is started to be tilted, and just before said rotational speeds becomes smaller than the preset value.

The synchronous speed control means includes a means which is adapted to reduce the change rate of the speed change ratio just before said difference in the rotational speeds becomes smaller than the preset value, to be relatively smaller than the change rate of the speed change ratio of just after start tilting the rotational center axis of the rolling member.

In order to change the synchronous speed as explained above, the speed change control system of the present invention can be further provided with an oil temperature detecting means which is adapted to detect an oil temperature of the transmission. In this case, the aforementioned synchronous speed control means can be adapted to reduce the change rate of the speed change ratio just before said difference in the rotational speeds becomes smaller than the preset value in case the oil temperature detected by the oil temperature detecting means is relatively low, in comparison with that of the case in which the oil temperature detected by the oil temperature detecting means is relatively high.

Alternatively, in order to change the synchronous speed as explained above, the speed change control system of the present invention can be further provided with a load detecting means which is adapted to detect an output torque of a prime mover connected with the transmission. In this case, the aforementioned synchronous speed control means can be adapted to reduce the change rate of the speed change ratio just before said difference in the rotational speeds becomes smaller than the preset value in case the output torque detected by the load detecting means is relatively low, in comparison with that of the case in which the output torque detected by the load detecting means is relatively high.

Moreover, in order to change the synchronous speed as explained above, the speed change control system of the present invention can be further provided with a speed detecting means which is adapted to detect an output speed of the prime mover connected with the transmission. In this case, the aforementioned synchronous speed control means can be adapted to reduce the change rate of the speed change ratio just before said difference in the rotational speeds becomes smaller than the preset value in case the speed detected by the speed detecting means is relatively high, in comparison with that of the case in which the speed detected by the speed detecting means is relatively low.

Still moreover, in order to change the synchronous speed as explained above, the speed change control system of the present invention can be further provided with a mode shifting means which is adapted to select a driving mode where a drive torque of the vehicle is reduced relatively. In this case, the aforementioned synchronous speed control means can be adapted to reduce the change rate of the speed change ratio just before said difference in the rotational speeds becomes smaller than the preset value in case the driving mode where the drive torque is reduced relatively is selected, in comparison with that of the case in which the driving mode where the drive torque is reduced relatively is not selected.

In addition, the aforementioned synchronous speed control means can be adapted to reduce the change rate of the speed change ratio just before said difference in the rotational speeds becomes smaller than the preset value in case a speed change ratio set by the geared transmission is relatively large, in comparison with that of the case in which the speed change ratio set by the geared transmission is relatively small.

Further, in order to change the synchronous speed as explained above, the speed change control system of the present invention can be further provided with a speed changing rate detecting means which is adapted to detect a change rate of a speed of the prime mover connected with the transmission. In this case, the aforementioned synchronous speed control means can be adapted to reduce the change rate of the speed change ratio just before said difference in the rotational speeds becomes smaller than the preset value in case an increasing rate of the speed of the prime mover detected by the speed changing rate detecting means is relatively high, in comparison with that of the case in which the detected increasing rate of the speed of the prime mover is relatively low.

Furthermore, the synchronization command means can be adapted to increase the tilt angle of the rotational center axis of the rolling member larger than the tilt angle at which said rotational speeds are synchronized, and thereafter return said tilt angle to the angle at which the difference in said rotational speeds becomes smaller than the preset value. In this case, the speed change execution means shifts said one of the switching mechanisms thereby engaging said one of the switching mechanisms with the member to be engaged therewith, when said difference in the rotational speeds becomes smaller than the preset value by returning said tilt angle.

Thus, according to the speed change control system of the present invention, rotation radii, that is, distances between the rotational center axis of the rolling member and each of the contact points at which the rotary members are contacted individually with the rolling member are varied by tilting the rotational center axis of the rolling member. Consequently, a speed change ratio between the rotational speeds of the second rotary member connected with the first intermediate shaft and the third rotary member connected with the second intermediate shaft is varied. More specifically, one of the rotational speeds of the second and the third rotary members is increased, and the rotational speed of the other rotary member is lowered. That is, speed change operations to increase and decrease the rotational speeds of the second and the third rotary members with respect to the rotational speed of the first rotary member are achieved simultaneously. Meanwhile, in the geared transmission, a speed change ratio is set according to a gear ratio of the transmission mechanism, by engaging any one of the switching mechanisms with any one of the transmission mechanisms thereby transmitting the torque to the output member through the engaged transmission mechanisms. Therefore, a total speed change ratio of the transmission is set according to the speed change ratio of the continuously variable transmission mechanism and the speed change ratio of the geared transmission mechanism.

In case of transmitting the torque to the output member from one of the intermediate shafts, the torque is not being transmitted between the other intermediate shaft and the output member. However, the transmission mechanism arranged between the other intermediate shaft and the output member is connected with the other intermediate shaft or the output member, and therefore being rotated in this situation. Specifically, the speed change operation of the geared transmission mechanism is carried out by shifting the switching mechanism thereby switching the transmission mechanism to transmit the torque. That is, in case of carrying out the speed change operation of the geared transmission mechanism, the switching mechanism being disengaged is engaged with the transmission mechanism which is not transmitting the torque thereby connecting said transmission mechanism with the intermediate shaft or the output member. As explained, a speed increasing operation and a speed decreasing operation can be achieved simultaneously by tilting the rolling member of the continuously variable transmission mechanism. Therefore, in this situation, the rolling member is tilted at an angle and in the direction in accordance with the speed change operation of the geared transmission mechanism, thereby synchronizing the rotational speed of the switching mechanism and the rotational speed of the member to be engaged gradually with the switching mechanism. Then, when those rotational speeds are synchronized with each other or becomes smaller than the preset value, the switching mechanism is engaged with a predetermined transmission mechanism. Therefore, the rotational speeds will not be varied abruptly and significantly even when the switching mechanism is engaged so that an occurrence of shocks can be avoided and the speed change operation can be carried out smoothly. In this situation, the switching mechanism being engaged previously is disengaged and the speed change operation is completed. For this reason, even if the speed change operation of the geared transmission mechanism is executed stepwise, an entire speed change operation of the transmission can be executed steplessly while eliminating a step between the speed change ratios of before and after the speed change operation. As described, such continuous speed change operation is carried out by tilting the rolling member to synchronize the rotational speeds. That is, the speed change operation can be carried out without requiring any special power unit so that no power is consumed to carry out the speed change operation. Therefore, according to the present invention, the transmission can be downsized entirely.

As described, the control system of the present invention comprises the returning means. Therefore, the speed change ratio of the geared transmission can be adopted as the total speed change ratio of the transmission, and the continuously variable transmission mechanism is allowed to stay in a standby condition to be prepared for the upcoming speed change operation.

As also described, the control system of the present invention comprises the neutral command means. Therefore, the rolling member can be tilted widely in both positive and negative directions to carry out the synchronous control on the occasion of carrying out the subsequent speed change operation. For this reason, the tilt angle of the rolling member can be controlled easily in the subsequent speed change operation.

Further, the control system of the present invention comprises the tilt angle control means. Therefore, the tilt angle of the rolling member is returned to the neutral angle at which the speed change ratio of the continuously variable transmission mechanism becomes "1", after said difference in the rotational speeds becomes smaller than the preset value and the switching mechanism is therefore shifted to be engaged. For this reason, said rotational speeds can be synchronized by tilting the rolling member in a manner to set an intermediate speed change ratio between the gear stages of the geared transmission mechanism. Thus, the tilt angle of the rolling member can be controlled easily and said rotational speeds can be synchronized easily.

According to the present invention, in case of carrying out the synchronous control by the continuously variable transmission mechanism, the change rate of the speed change ratio can be reduced relatively just before said difference in the rotational speeds becomes smaller than the preset value. Therefore, a difference in the rotational speed of the switching mechanism and the rotational speed of the member to be engaged with the switching mechanism can be reduced when the switching mechanism is engaged with the member to be engaged therewith. For this reason, shocks resulting from engaging the switching mechanism can be prevented or reduced.

As described, the change rate of the speed change ratio is reduced just before the synchronization of said rotational speeds in accordance with; the oil temperature; the output torque of the prime mover, that is, the input torque of the transmission; the rotational speed of the prime mover, that is, the input speed of the transmission and the change rates of those speeds; the selected driving mode; the speed change ratio set by the geared transmission mechanism; and so on. Therefore, the change rate of the speed change ratio can be optimized in accordance with the above-listed factors when synchronizing said rotational speeds. For this reason, the shocks can be prevented or reduced more effectively.

In addition to the above-explained advantages, according to the present invention, it is also possible to tilt the rolling member to the angle larger than the tilt angle at which said rotational speeds are synchronized, and thereafter return the tilt angle to the angle at which said rotational speeds are synchronized. In this case, the rotational speed of the switching mechanism and the rotational speed of the member to be engaged with the switching mechanism can be synchronized or approximated with each other quickly, without carrying out any special control for reducing the change rate of the speed change ratio during the synchronous control. Therefore, the synchronous control to be carried out during the speed change control, or the synchronous control itself can be expedited. In other words, a delay in the speed change operation can be prevented or avoided.

BEST MODE FOR CARRYING OUT THE INVENTION

Figure 15:
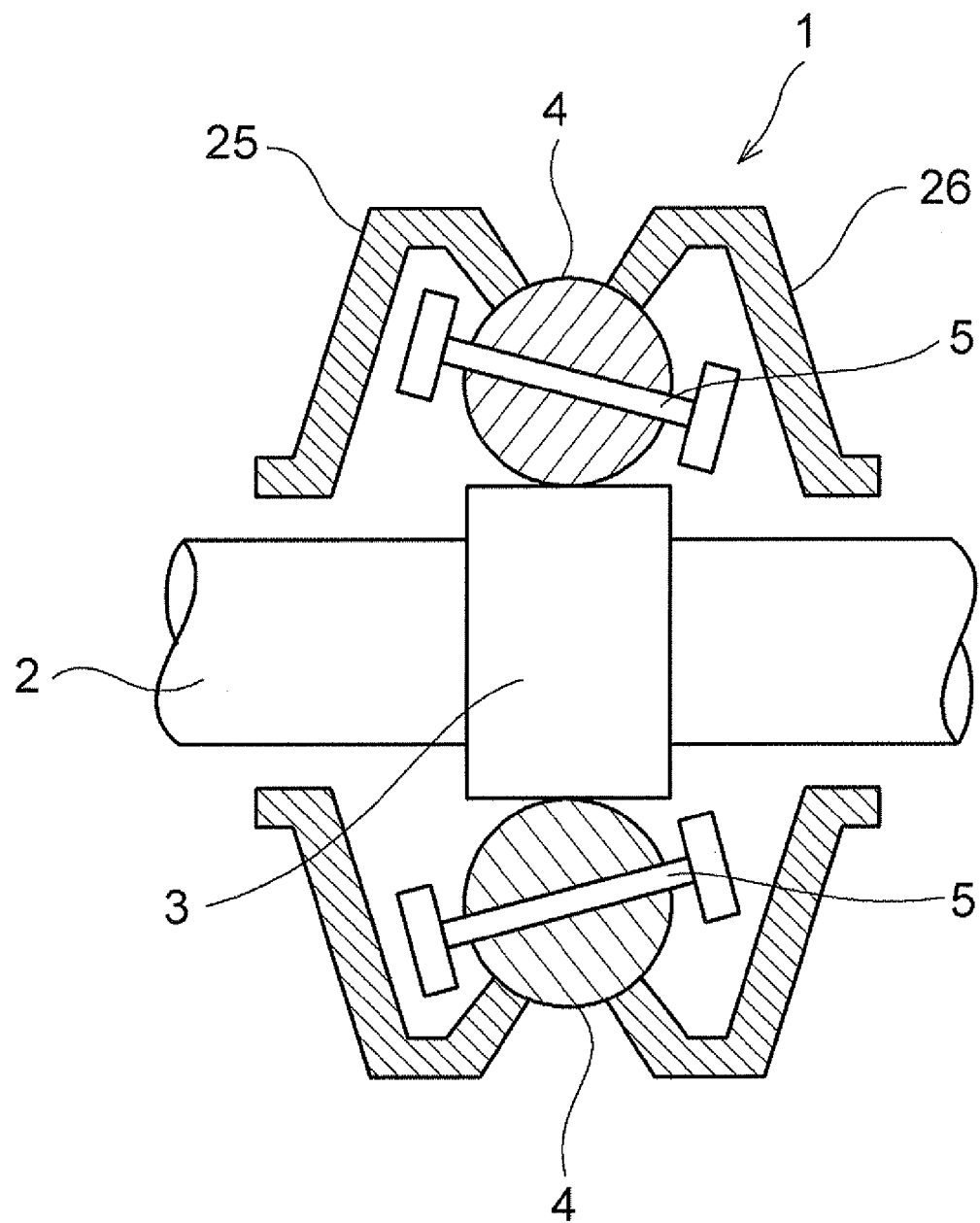
FIG. 15 is a partially omitted sectional view schematically showing one example of a continuously variable transmission mechanism according to the present invention.
Figure 21:
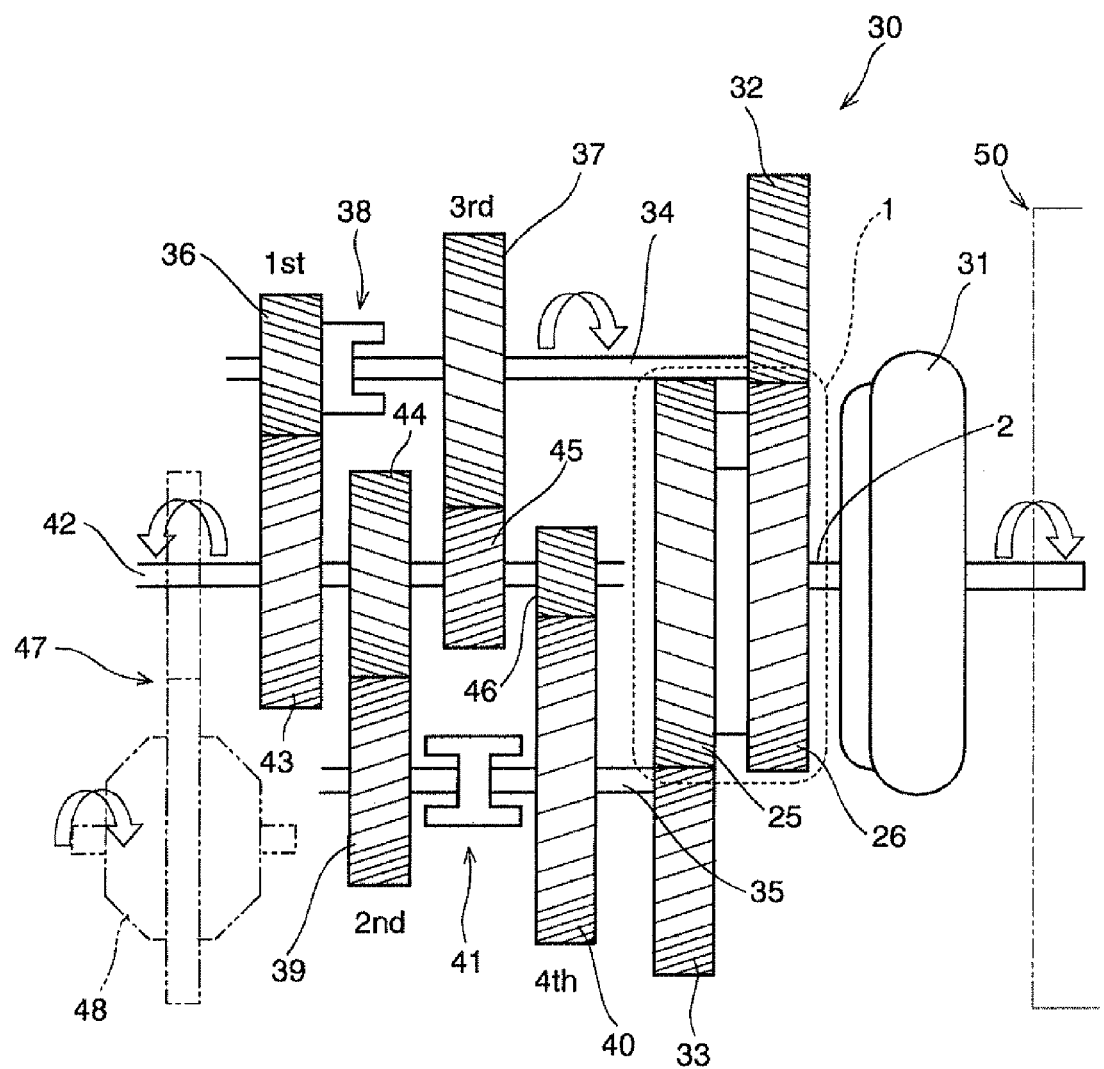
FIG. 21 is a view schematically showing one example of a transmission arranged between the continuously variable transmission mechanism used in the present invention and an output member.

Next, this invention will be described in connection with its specific examples. The transmission of the present invention to be used in a vehicle is structured by connecting a continuously variable transmission and a geared transmission in series. An example of the continuously variable transmission (i.e., a DUO-CVT) 1 is shown in FIG. 15. In the continuously variable transmission mechanism 1, a torque is transmitted among three rotary elements (or rotary member). Specifically, the continuously variable transmission mechanism 1 is configured to vary a speed change ratio between a first rotary member functioning as an input member and a second rotary member functioning as a first output member continuously and steplessly, and to vary a speed change ratio between the input member and a third rotary member functioning as a second output member continuously and steplessly. In FIG. 15, reference numeral 2 represents an input shaft, and a roller 3 is fitted onto the input shaft 2 to be rotated integrally with the input shaft 2. Those input shaft 2 and the roller 3 correspond to the first rotary member of the present invention. Specifically, the roller 3 is a cylindrical member, and an outer circumferential face thereof serves as a torque transmission face. In addition, a plurality of rolling members 4 is arranged around the torque transmission face while being contacted therewith. As shown in FIG. 21, a prime mover 50 is connected with the input shaft 2 in a torque transmittable manner. The prime mover 50 serves as a power source of a vehicle, and for example, at least one of an engine and an electric motor can be used to serve as the prime mover 50. In the example to be explained hereinafter, an engine is used as the prime mover 50, and the prime mover 50 is to be called as the engine 50 for the sake of convenience.

As explained later, the rolling member 4 is adapted to mediate a torque transmission, and to vary a speed change ratio of the continuously variable transmission 1. For this purpose, an outer circumferential face of the rolling member 4 is formed into a smooth curved face. Therefore, the rolling member 4 is allowed to be rotated smoothly by a rotation of the roller 3 and the input shaft 2. Specifically, the rolling member 4 is a spherical member such as a steel ball, or an ellipsoidal member like a rugby ball whose sectional shape is oval. In the example to be explained hereinafter, a spherical member such as a steel ball is used to serve as the rolling member 4. Therefore, the rolling member will be called as a ball 4 in the explanation.

Figure 16:
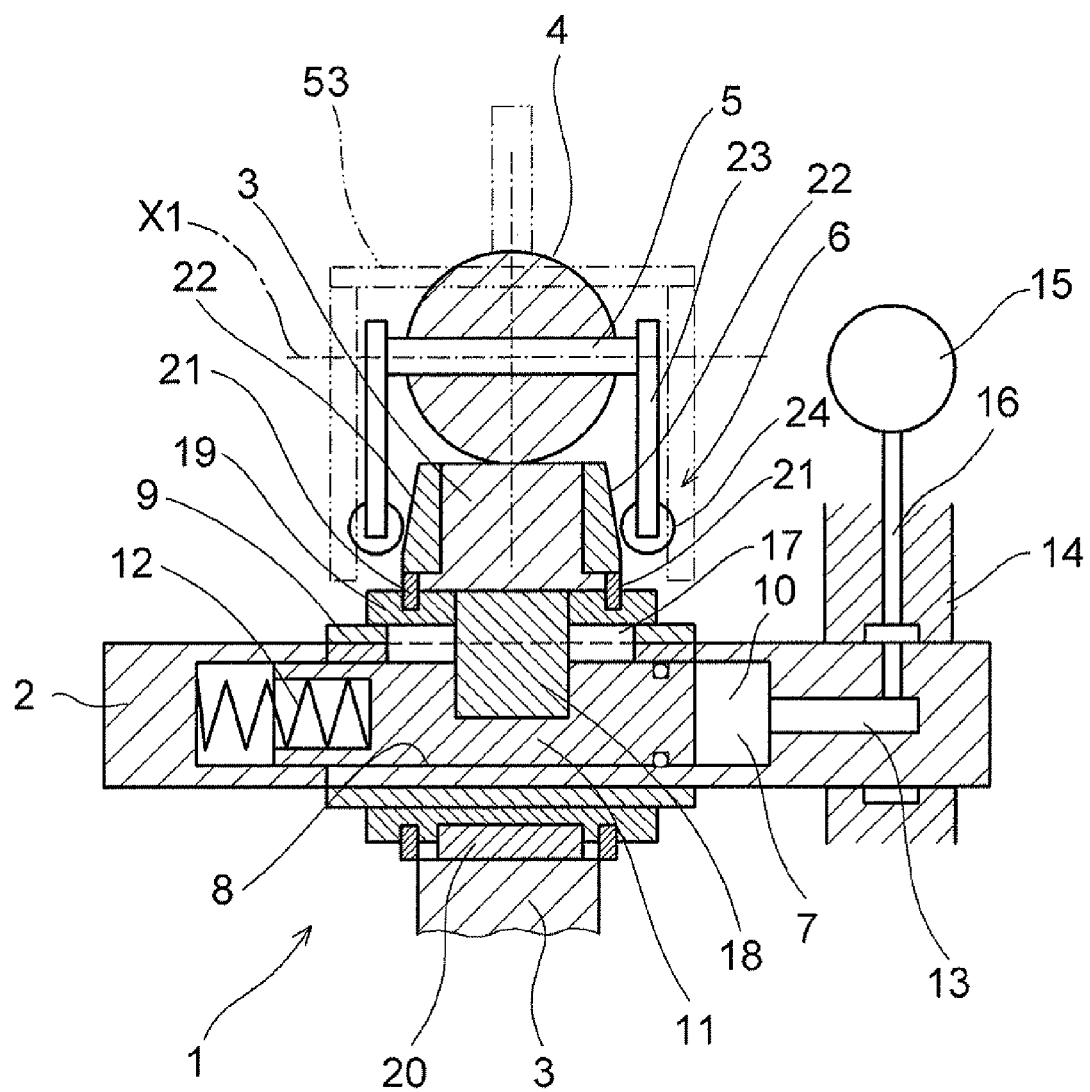
FIG. 16 is a sectional view schematically showing one example of a tilt angle adjusting mechanism for tilting the rolling member of the continuously variable transmission mechanism shown in FIG. 15.
Figure 17:
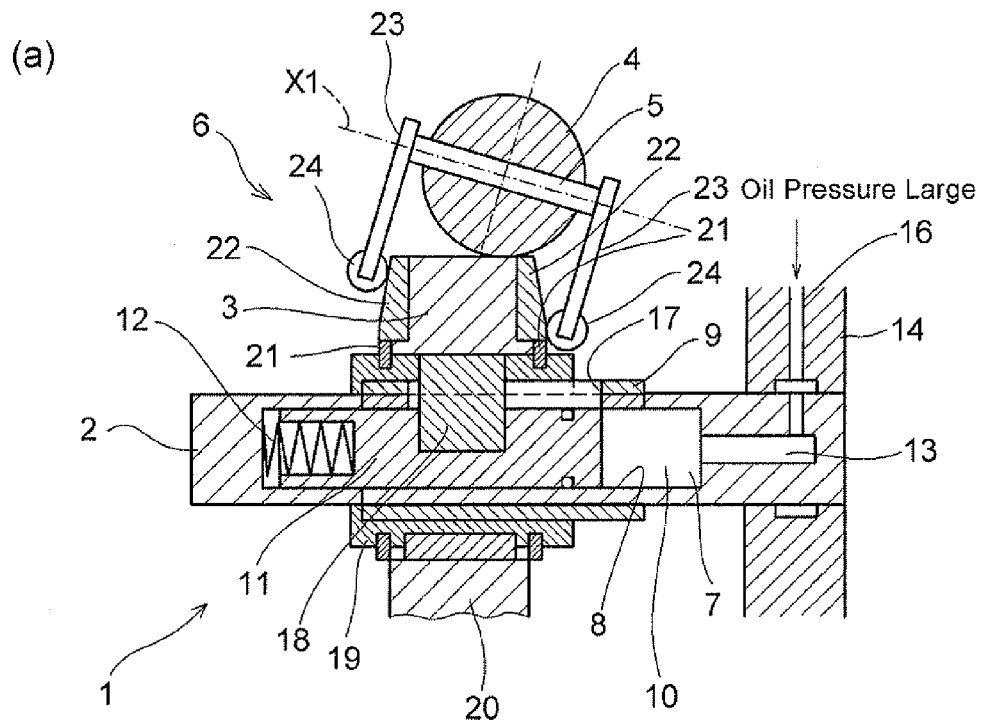
FIGS. 17($a$) and 17($b$) are sectional views schematically showing operating states of the tilt angle adjusting mechanism shown in FIG. 16.
Figure 17:
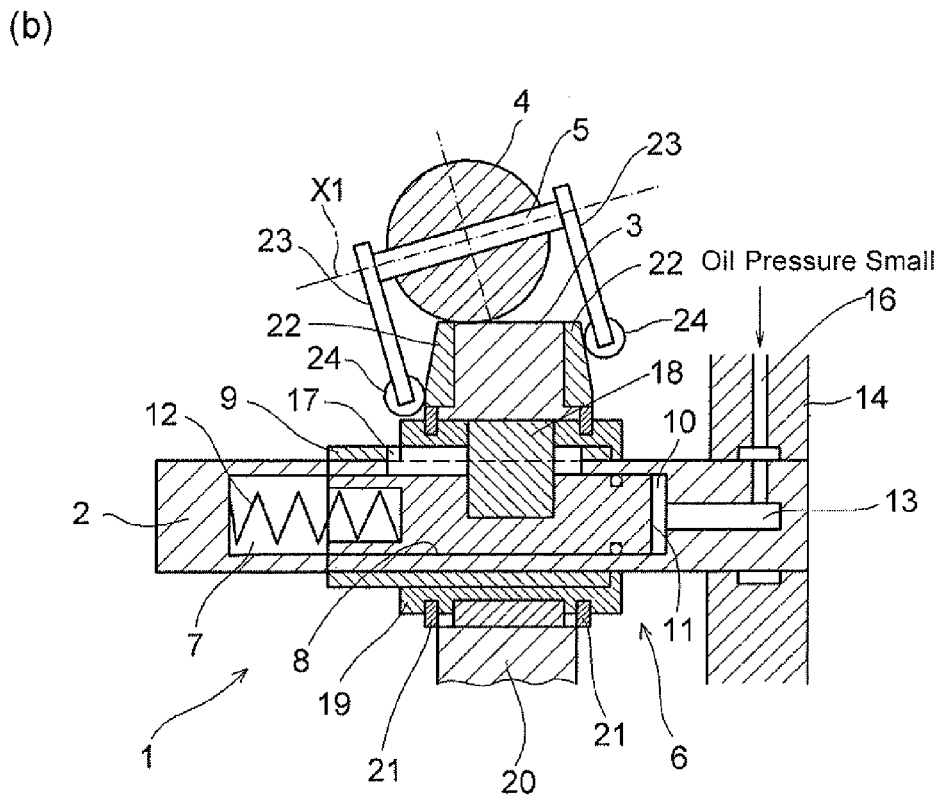

The plurality of balls 4 are arranged around the outer circumferential face of the roller 3 at regular intervals, and contacted with the outer circumferential face of the roller 3 in a torque transmittable manner. As shown in FIGS. 16 and 17, a support shaft 5 penetrates each ball 4, and the ball 4 is held to rotate around the support shaft 5 as a rotational center axis X1. In order to hold the ball 4 in a manner to rotate freely while inhibiting revolution of the ball 4, a support (or a carrier) 53 is formed integrally with a casing of the continuously variable transmission 1. As shown in FIG. 16, the support 53 is extended in the vicinity of the ball 4, and the support shaft 5 is held by the support 53. A ball stator 23 is attached to each end portion of the support shaft 5, and the ball stator 23 extends to near the outer face of a thrust idler 22. That is, the rotational center axis X1 of the support shaft 5 is tilted within a plane shown in FIG. 16 by moving the ball stator 23 along a groove formed on the support 53. The support 53 may be configured to hold the support shaft 5 in a rotatable manner. Alternatively, it is also possible to configure the support 53 to hold the support shaft 5 in a manner not to allow the support shaft 5 to rotate but to allow the ball 4 to rotate around the support shaft 5. As described, the support 53 is fixed to the casing of the continuously variable transmission 1, and the support 53 is not allowed to rotate.

Figure 18:
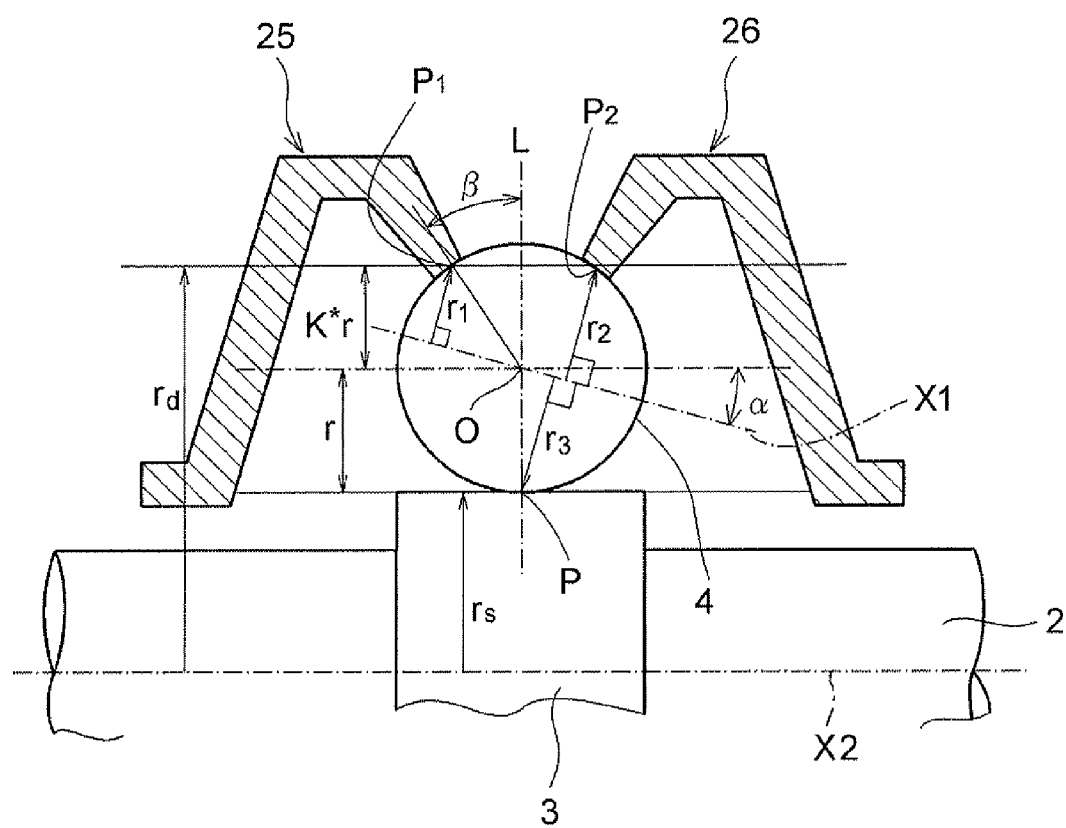
FIG. 18 is an explanation drawing showing a mechanism of the continuously variable transmission mechanism shown in FIG. 15.

Thus, the support shaft 5 serves as a rotational center axis of the rolling member 4. As shown in FIG. 18, the rotational center axis X1 of the support shaft 5 is situated in a plane including a rotational center axis X2 of the input shaft 2 and the roller 3, and allowed to be tilted with respect to the rotational center axis X2. Specifically, the support shaft 5 shown in FIG. 15 (i.e., the rotational center axis X1) is held while being allowed to be oscillated. One example of a tilt angle adjusting mechanism 6 for inclining the support shaft 5 penetrating the ball 4 is shown in FIGS. 16 and 17.

In the example shown in FIGS. 16 and 17, a hollow portion 7 is formed inside of the input shaft 2, and a slide pin 9 having a through hole 8 is arranged on an axially intermediate portion of the input shaft 2. An inner diameter of the through hole 8 is identical to that of the hollow portion 7, and the hollow portion 7 and the through hole 8 are integrated to form a cylinder 10. In the cylinder 10, a piston 11 is housed in a manner to reciprocate in the axial direction while keeping a liquid-tight condition. In order to push the piston 11 in the axial direction, a return spring 12 is arranged in the cylinder 10 on one of end sides thereof.

The other end of the cylinder 10 is communicated with one of end portions of an oil passage 13 formed in the input shaft 2 in the axial direction. The other end portion of the oil passage 13 opens toward a portion of an outer circumferential face of the input shaft 2 fitted with a casing 14. In the casing 14, an oil passage 16 is formed to be connected with a hydraulic pressure generating device 15, and the oil passages 13 and 16 are communicated with each other at a portion where the input shaft 2 is fitted with the casing 14. Here, the hydraulic pressure generating device 15 comprises a (not shown) control device adapted to control an operating oil to be fed to the oil passage 16 and discharged from the oil passage 16. That is, the hydraulic pressure generating device 15 is adapted to feed the hydraulic pressure to the cylinder 10 thereby moving the piston 11 toward the left side in FIGS. 16 and 17, and to discharge the hydraulic pressure from the cylinder 10.

A slit 17 is formed to penetrate the aforementioned slide pin 9 within a predetermined length in the axial direction. Specifically, the length of the slit 17 is shorter than the piston 11. Therefore, the slit 17 is kept closed by the piston 11 even if the piston 11 is moved in the axial direction. The piston 11 is fitted with a pin 18 protruding toward an outer circumferential side of the slide pin 9 through the slit 17. Further, a cylindrical roller stator 19 is fitted onto an outer circumferential face of the slide pin 9. The roller stator 19 is allowed to be moved in the axial direction and to be rotated integrally with the slide pin 9. A leading end of the aforementioned pin 18 attached to the piston 11 is inserted into the roller stator 19. That is, the piston 11 is integrated with the roller stator 19 through the pin 18.

The aforementioned roller 3 is fitted onto an outer circumferential face of the roller stator 19 to be reciprocated in the axial direction together with the piston 11. Specifically, the roller 3 is integrated with the roller stator 19 by a key 20 in a rotational direction, and integrated with the roller stator 19 by a snap ring 21 in the axial direction. In order to maintain a contact between the roller 3 and the ball 4 even if the roller 3 is moved in the axial direction, the roller 3 has a predetermined length in the axial direction. In addition, a thrust idler 22 whose outer face is tapered is attached to each axial end of the roller 3. Meanwhile, a ball stator 23 is attached to each end portion of the support shaft 5 penetrating through the ball 4. The ball stator 23 extends to near the outer face of the thrust idler 22, and a guide roller 24 is attached to a leading end of the ball stator 23 in a manner to be contacted with the outer face of the thrust idler 22. The support shaft 5 and the ball 4 supported by the support shaft 5 are held in a manner not to move in the direction along the rotational center axis X2 of the input shaft 2, but the support shaft 5 is allowed to be tilted. Specifically, according to the tilt angle adjusting mechanism 6 shown in FIGS. 16 and 17, the guide roller 24 is moved vertically along the surface of the thrust idler 22 when the roller 3 fitted with the thrust idlers 22 is moved in the axial direction. As a result, the support shaft 5 penetrating the ball 4 is inclined.

Operating state of the tilt angle adjusting mechanism 6 is shown in FIGS. 17(a) and 17(b) in more detail. Specifically, when the operating oil is fed to the cylinder 10 from the hydraulic pressure generating device 15, the hydraulic pressure of the operating oil exceeds an elastic force of the return spring 12. As a result, the piston 11 is moved to the left side while compressing the return spring 12 as shown in FIG. 17 (a). As described, the piston 11 is connected with the roller stator 19 through the pin 18. Therefore, in this situation, the roller 3 is moved to the left side in FIG. 17 (a) together with the thrust idlers 22 attached to both sides of the roller 3. Consequently, the guide rollers 24 contacted individually with the inclined faces of the thrust idlers 22 roll along the inclined faces of the thrust idlers 22, and the support shaft 5 connected with the guide rollers 24 through the ball stators 23 is thereby inclined toward the right side in FIG. 17 (a).

To the contrary, when the operating oil is discharged from the cylinder 10, the hydraulic pressure in the cylinder 10 is reduced to be weaker than the elastic force of the return spring 12. As a result, the piston 11 is pushed by the return spring 12 toward the right side as shown in FIG. 17 (b). In this situation, since the piston 11 is connected with the roller stator 19 through the pin 18, the roller 3 is moved to the right side in FIG. 17 (b) together with the thrust idlers 22 attached to both sides of the roller 3. Consequently, the guide rollers 24 contacted individually with the inclined faces of the thrust idlers 22 roll along the inclined faces of the thrust idlers 22, and the support shaft 5 connected with the guide rollers 24 through the ball stators 23 is thereby inclined toward the left side in FIG. 17 (b). Thus, a position of the piston 11, that is, a tilt angle of the support shaft 5 penetrating the ball 4 can be adjusted by controlling an amount of the operating oil in the cylinder 10. In addition, the tilt angle of the support shaft 5 can be controlled by a feedback control. For this purpose, a target speed change ratio of the continuously variable transmission 1 is calculated, and the feedback control is carried out on the basis of a deviation between the calculated target speed change ratio and an actual speed change ratio.

A purpose of thus tilting the support shaft 5 penetrating through the ball 4 is to vary the speed change ratio of the continuously variable transmission 1. For this purpose, a pair of output members to which the torque is transmitted through the ball 4 is arranged while being contacted with the outer face of the ball 4. In the examples shown in FIGS. 15 and 18, a first output disc 25 and a second output disc 26 are provided to serve as the output members. Those discs 25 and 26 are thin plate-like or bawl-like rotary members configured to rotate around the rotational center axis X2 of the input shaft 2, and inner circumferential opening edges of discs 25 and 26 are contacted individually with the outer face of the ball 4 in a torque transmittable manner. Here, the ball 4 can be contacted not only directly with the discs 25 and 26 as well as the roller 3 but also contacted indirectly with those members through an oil film of traction oil.

Preferably, both of the first output disc 25 and the second output disc 26 are formed into a same configuration or symmetric configurations. As shown in FIG. 15, those discs 25 and 26 are arranged on symmetric positions across the ball 4. That is, the discs 25 and 26 are contacted with symmetric sites of the outer surface of the ball 4. The mechanism is to be explained in more detail with reference to FIG. 18. As shown in FIG. 18, opening ends of the discs 25 and 26 are contacted with symmetric portions of the ball 4 across a line L passing through a center O of the ball 4 and a contact point P at which the ball 4 is contacted with the roller 3. A circumferential velocity at a contact point P1 is proportional to a distance r1 between the contact point P1 and the rotational center axis X1 of the ball 4, and a circumferential velocity at a contact point P2 is proportional to a distance r2 between the contact point P2 and the rotational center axis X1 of the ball 4. Therefore, in case the ball 4 is not tilted so that the support shaft 5 is kept parallel to the input shaft 2, the circumferential velocities at the contact points P1 and P2, that is, rotational speeds of the discs 25 and 26 are equalized. However, in case the ball 4 is tilted so that the support shaft 5 is inclined with respect to the input shaft 2, the rotational speed of any one of the discs 25 and 26 is increased relatively, and the rotational speed of the other disc 25 or 26 is lowered relatively. In addition, it is also possible to configure the continuously variable transmission mechanism 1 to equalize the rotational speeds of the discs 25 and 26 while inclining the support shaft 5. In this case, the contact point between the ball 4 and the disc 25, and the contact point between the ball 4 and the disc 26 are adjusted to be deviated slightly from the aforementioned symmetrical portions across the line L.

The torque is frictionally transmitted between the ball 4 and the disc 25 and between the ball 4 and the disc 26 directly or indirectly through the traction oil. Specifically, a torque can be transmitted between the ball 4 and the disc 25 (or 26) according to a contact pressure therebetween. Therefore, the discs 25 and 26 are individually pushed to be contacted with the ball 4 by a predetermined pressure to achieve a desired transmission torque capacity. For this purpose, although not shown in the accompanying figures, an elastic mechanism such as a disc spring or a hydraulic mechanism is used as a pushing mechanism for pushing the discs 25 and 26 in the axial direction.

Next, an action of the continuously variable transmission mechanism 1 will be explained hereinafter. For example, in case a shift position is shifted to D range (i.e., Drive range) and a torque is inputted to the input shaft 2 from the engine 50 so that the roller 3 is rotated together with the input shaft 2, the torque is transmitted to the ball 4 being contacted with the outer face of the roller 3 and the ball 4 is thereby rotated. In this situation, the ball 4 is rotated around the rotational center of the support shaft 5 in a direction opposite to a rotational direction of the roller 3. As described, the first output disc 25 and the second output disc 26 are contacted with the outer face of the ball 4 in a torque transmittable manner. Therefore, the torque is then transmitted to the discs 25 and 26. As a result, the discs 25 and 26 are rotated in the same direction as the rotational direction of the ball 4, that is, in the direction opposite to the rotational direction of the input shaft 2. Thus, the ball 4 serves as an idler or a planetary roller to transmit the torque from the input shaft 2 to the discs 25 and 26 through the ball 4. In this situation, a number of rotations (i.e., a rotational speed) of the ball 4 with respect to that of the roller 3, and a number of rotations of each disc 25 and 26 with respect to that of the roller 3 are governed by a rotation radius of the contact point between the ball 4 and each element (that is, by a distance between the support shaft 5 as the rotational center axis of the ball 4 and each element). Specifically, the rotation radius of the contact point between the ball 4 and abovementioned each element is varied according to a tilt angle α of the ball 4 (or the shaft 5) as explained hereinafter. That is, a speed change ratio, in other words, a ratio between the rotational speed of the first output disc 25 with respect to that of the input shaft 2 and the rotational speed of the second output disc 26 with respect to that of the input shaft 2 can be varied by varying the tilt angle α of the ball 4.

A principle of such a speed change will be explained in more detail with reference to FIG. 18. In case the discs 25 and 26 are contacted with symmetric positions of the outer face of the ball 4 across the line L, a distance between the contact point P1 or P2 and the center axis of the support shaft 5 which is not inclined (i.e., a rotation radius) is shorter than a radius r of the ball 4. In FIG. 18, k represents a ratio between: the distance between the contact point P1 or P2 and the center axis of the not inclined support shaft 5; and the radius r of the ball 4. That is, k represents a coefficient of contact point. Accordingly, an angle β between the contact point P1 or P2 and the line L can be obtained by:

$$\beta = \cos^{-1} k.$$

Here, the distance between the contact point P1 or P2 and the center axis of the not inclined support shaft 5 can be obtained by (k·r). Further, a radius rd of the contact point P1 of the disc 25 or the contact point P2 of the disc 26 (from the center axis of the input shaft 2, i.e., a rotation radius) can be obtained by the following formula:

$$rd = rs + r(1+k)$$

where rs represents a radius of the roller 3.

In case the ball 4 tilts at an angle of α (that is, in case the tilt angle of the support shaft 5 with respect to the input shaft 2 is α), a rotation radius r1 of the contact point P1 between the first output disc 25 and the ball 4, a rotation radius r2 of the contact point P2 between the second output disc 26 and the ball 4, and a rotation radius r3 of a contact point P between the ball 4 and the roller 3 can be expressed individually by the following expressions:

$$r1 = r \cdot \sin[\pi/2 - (\alpha+\beta)] = r \cdot \cos(\alpha+\beta);$$

$$r2 = r \cdot \sin[\pi/2 + (\alpha-\beta)] = r \cdot \cos(\alpha-\beta); \text{ and}$$

$$r3 = r \cdot \cos \alpha.$$

Here, a definition of the rotation radius is a distance between the center axis of the support shaft 5 (i.e., the rotational center axis of the ball 4) and each contact point.

Accordingly, in case the input shaft 2 (or the roller 3) is rotated at a speed nr, a rotational speed n1 of the first output disc 25, and a rotational speed n2 of the second output disc 26 can be obtained individually by the following formulas:

$$n1 = nr \cdot rs/r3 \cdot r1/rd; \text{ and}$$

$$n2 = nr \cdot rs/r3 \cdot r2/rd.$$

Further, a ratio between the rotational speeds n1 and n2 can be expressed as:

$$n2/n1 = \cos(\alpha-\beta)/\cos(\alpha+\beta).$$

Figure 19:
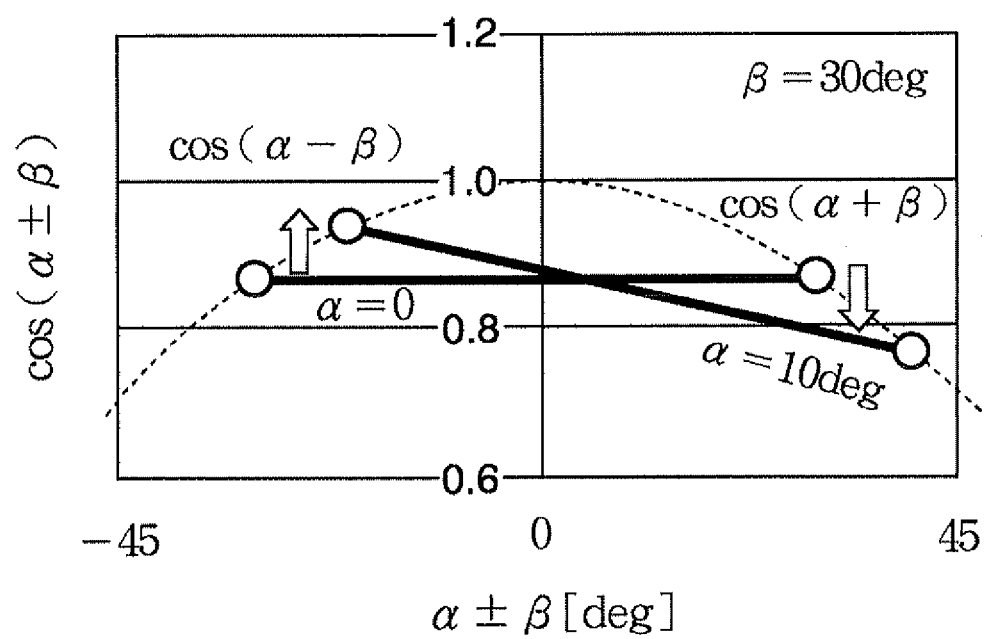
FIG. 19 is a diagram showing a relation between a tilt angle of the rolling member of the continuously variable transmission mechanism used in the invention, and cos ($\alpha+\beta$) and cos ($\alpha-\beta$).

In case the tilt angle α of the ball 4 is varied under the condition in which the aforementioned angle β is kept to a constant degree (e.g., at a 30 degree), values of cos(α−β) and cos(α+β) are varied as shown in FIG. 19. Specifically, when the tilt angle α is varied in a positive or negative direction, one of the values of cos(α−β) and cos(α+β) is increased and the other value is decreased. That is, the rotational speeds are increased and decreased simultaneously and continuously.

Figure 20:
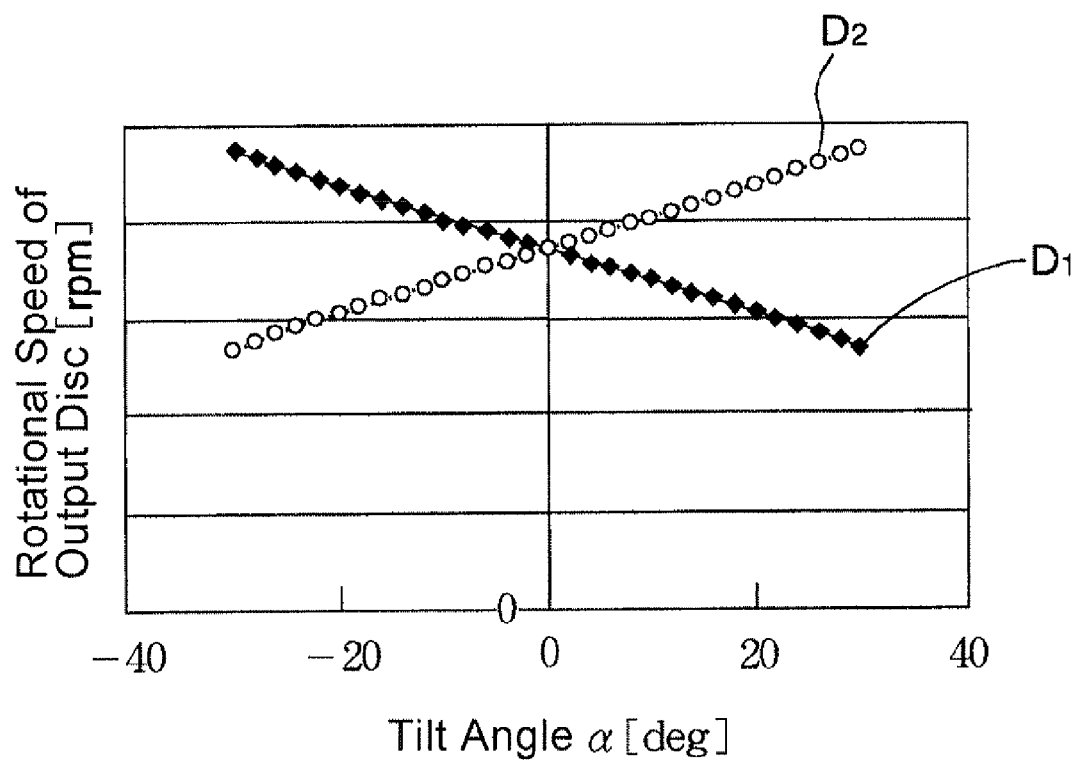
FIG. 20 is a diagram showing a relation between a tilt angle of the rolling member and rotational speeds of the discs in the continuously variable transmission mechanism shown in FIG. 15.

Changes in the rotational speeds of the discs 25 and 26 resulting from changing the tilt angle α are shown in FIG. 20. In FIG. 20, D1 represents a rotational speed of the first output disc 25, and D2 represents a rotational speed of the second output disc 26. As can be seen from FIG. 20, in case the tilt angle α is increased in the positive direction (that is, in case the support shaft 5 is inclined toward the right side in FIG. 18), the rotational speed D1 of the first output disc 25 is lowered and the rotational speed D2 of the second output disc 26 is increased with the increase in the tilt angle α. To the contrary, in case the tilt angle α is increased in the negative direction (that is, in case the support shaft 5 is inclined toward the left side in FIG. 18), the rotational speed D1 of the first output disc 25 is increased and the rotational speed D2 of the second output disc 26 is lowered with the increase in the tilt angle α in the negative direction.

Thus, according to the continuously variable transmission mechanism 1, the torque can be transmitted among three rotary members, that is, among the input shaft 2 and the output discs 25 and 26. In addition, the speed change ratio between the input shaft 2 and one of the output discs 25 and 26, and the speed change ratio between the input shaft 2 and the other output disc 25 or 26, can be varied simultaneously and continuously. That is, a speed change for increasing the speed and a speed change for reducing the speed can be carried out simultaneously. Therefore, the continuously variable transmission mechanism 1 can be used as a speed reducing mechanism for reducing the rotational speeds of the discs 25 and 26 to the speed lower than the rotational speed of the input shaft 2.

Next, here will be explained one example of a geared transmission 30 arranged between the continuously variable transmission mechanism 1 and an output shaft 42 with reference to FIG. 21. The output shaft 42 is arranged in the geared transmission 30 side in the torque transmitting direction from the continuously variable transmission mechanism 1, and driven by a torque transmitted from the engine 50. The example of the geared transmission 30 shown in FIG. 21 is configured to set four forward stages. The input shaft 2 is connected with the engine 50 thorough an input transmission mechanism 31. Specifically, a starting clutch, a torque converter or the like is used as the input transmission mechanism 31, and a role of the input transmission mechanism 31 is to keep the engine 50 rotating even when a vehicle having the transmission 30 is stopping. In the example shown in FIG. 21, a counter drive gear having teeth on its outer circumferential face is used to serve as the aforementioned first and second output discs 25 and 26. The second output disc 26 meshes with a first counter driven gear 32, and the first output disc 25 meshes with a second counter driven gear 33. The first counter driven gear 32 is fitted onto a first intermediate shaft 34, and the second counter driven gear 33 is fitted onto a second intermediate shaft 35. Thus, the intermediate shafts 34 and 35 are arranged parallel to each other, and also parallel to the input shaft 2.

In addition, a first drive gear 36 and a third drive gear 37 are fitted onto the first intermediate shaft 34 in a rotatable manner, and a first dog clutch 38 is arranged therebetween. Here, the first dog clutch 38 corresponds to the switching mechanism of the present invention. Specifically, the first dog clutch 38 is adapted to connect the first drive gear 36 and the third drive gear 37 selectively with the first intermediate shaft 34. For this purpose, the first dog clutch 38 is provided with a dog splined to the first intermediate shaft 34, and the dog is adapted to mesh with the drive gears 36 and 37 selectively. The dog may be moved in the axial direction of the first intermediate shaft 34 not only by a mechanism to be operated manually but also by a mechanism to be controlled electrically and actuated hydraulically or electromagnetically. In addition, a synchronizer, a multi plate disc clutch or the like may also be used as the first switching mechanism instead of the dog clutch 38.

Meanwhile, a second drive gear 39 and a fourth drive gear 40 are fitted onto the second intermediate shaft 35 in a rotatable manner, and a second dog clutch 41 is arranged therebetween. Here, the second dog clutch 41 also corresponds to the switching mechanism of the present invention. Specifically, the second dog clutch 41 is adapted to connect the second drive gear 39 and the fourth drive gear 40 selectively with the second intermediate shaft 35. For this purpose, the second dog clutch 41 is also provided with a dog splined to the second intermediate shaft 35, and the dog is adapted to mesh with the drive gears 39 and 40 selectively. The dog of the second dog clutch 41 may also be moved in the axial direction of the second intermediate shaft 35 not only by a mechanism to be operated manually but also by a mechanism to be controlled electrically and actuated hydraulically or electromagnetically. In addition, a synchronizer, a multi plate disc clutch or the like may also used as the second switching mechanism instead of the dog clutch 41.

The output shaft 42 is arranged parallel to the first intermediate shaft 34 and to the second intermediate shaft 35 in a rotatable manner, and a first driven gear 43, a second driven gear 44, a third driven gear 45 and a fourth driven gear 46 are fitted onto the output shaft 42. The first driven gear 43 meshes with the first drive gear 36, the second driven gear 44 meshes with the second drive gear 39, the third driven gear 45 meshes with the third drive gear 37, and the fourth driven gear 46 meshes with the fourth drive gear 40. In addition, the output shaft 42 is connected with a differential 48 through a gear pair 47 for example. A gear ratio (that is, a ratio between a teeth number of the drive gear and a teeth number of the driven gear) of the first gear pair is the largest ratio in the first to fourth gear pairs. The gear ratios of the second to fourth gear pairs are reduced in sequence, and accordingly, the gear ratio of the fourth gear pair is the smallest ratio. Those gear pairs for setting the gear stages correspond to the transmission mechanism of the present invention.

Figure 22:
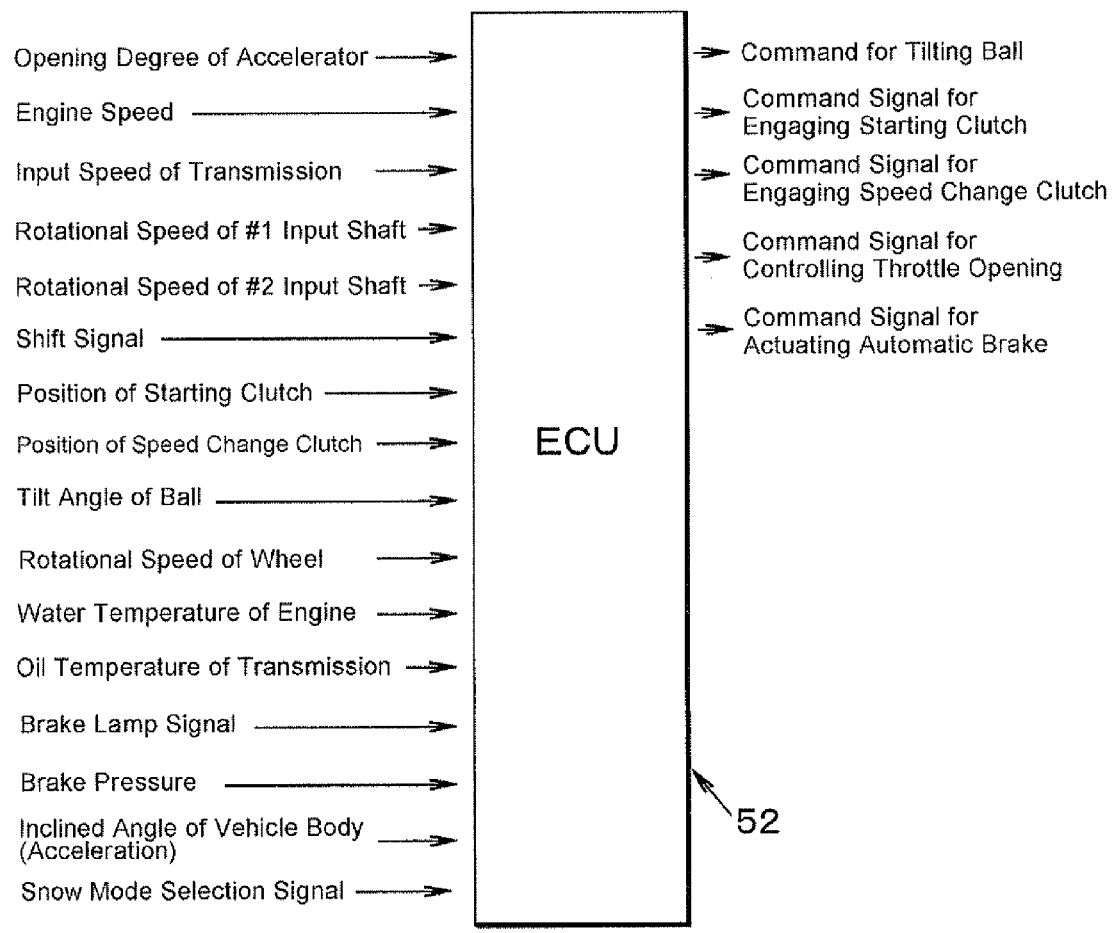
FIG. 22 is a block diagram showing signals to be inputted and outputted to/from an electronic control unit used in the speed change control system of the present invention.

The geared transmission 30 shown in FIG. 21 can be configured to be an automatic transmission capable of shifting the dog clutches 38 and 41 electrically. In this case, the geared transmission 30 is to be provided with an electronic control unit 52 shown in FIG. 22 for controlling the dog clutches 38 and 41. For instance, an opening degree of an accelerator, a speed of the engine 50, an input speed of the transmission (i.e., a rotational speed of the input shaft 2), a rotational speed of a first input shaft (i.e., the first intermediate shaft 34), a rotational speed of a second input shaft (i.e., the second intermediate shaft 35), a shift signal (i.e., a signal of a shift range), a position of a starting clutch (i.e., an engagement and a disengagement of the input transmission mechanism 31), a position of a speed change clutch (i.e., positions of the dog clutches 38 and 41), a tilt angle of the ball 4, a rotational speed of the wheel, a water temperature of the engine, a brake lamp signal, a brake pressure, an inclined angle of the vehicle body (in a longitudinal direction), a mode selection signal (for shifting a driving mode between a normal mode and a snow mode) and so on are inputted to the electronic control unit 52.

A speed change ratio of the transmission as thus far explained is governed by a speed change ratio set by the continuously variable transmission 1 and a speed change ratio set by the geared transmission 30, and the transmission is configured to set four forward stages. For example, the first stage can be achieved by shifting the first dog clutch 38 to the left side in FIG. 21 while setting the speed change ratio of the continuously variable transmission mechanism 1 to a predetermined ratio (e.g., to "1"). Consequently, the first dog clutch 38 is engaged with the first drive gear 36 and the torque is thereby allowed to be transmitted from the continuously variable transmission mechanism 1 to the output shaft 42 through the first intermediate shaft 34 and the first gear pair. As a result, the first stage is established. Under the situation where the first stage is thus being set, the gear stage can be shifted to the second stage by shifting the second dog clutch 41 to the left side in FIG. 21 to be engaged with the second drive gear 39, while shifting the first dog clutch 38 to a neutral position to be disengaged from the first drive gear 36. Consequently, the torque is allowed to be transmitted from the continuously variable transmission mechanism 1 to the output shaft 42 through the second intermediate shaft 35 and the second gear pair, and as a result, the second stage is established. Likewise, under the situation where the second stage is thus being set, the gear stage can be shifted to the third stage by shifting the first dog clutch 38 to the right side in FIG. 21 to be engaged with the third drive gear 37, while shifting the second dog clutch 41 to the neutral position to be disengaged from the second drive gear 39. Consequently, the torque is allowed to be transmitted from the continuously variable transmission mechanism 1 to the output shaft 42 through the first intermediate shaft 34 and the third gear pair, and as a result, the third stage is established. Further, under the situation where the third stage is thus being set, the gear stage can be shifted to the fourth stage by shifting the second dog clutch 41 to the right side in FIG. 21 to be engaged with the fourth drive gear 40, while shifting the first dog clutch 38 to the neutral position to be disengaged from the third drive gear 37. Consequently, the torque is allowed to be transmitted from the continuously variable transmission mechanism 1 to the output shaft 42 through the second intermediate shaft 35 and the fourth gear pair, and as a result, the fourth stage is established.

In case of thus setting a desired gear stage by engaging the dog clutch 38 or 41 with a predetermined drive gear, the dog clutch 38 or 41 is rotated at a speed different from a rotational speed of the drive gear to be engaged therewith. Therefore, the speed change control system of the present invention is configured to carry out a synchronous control thereby eliminating the above-explained discrepancy in the rotational speeds. Such synchronous control is carried out in the continuously variable transmission mechanism 1 by tilting the ball 4 according to the gear stage to be set. Specifically, when the ball 4 is tilted, a rotational speed of one of the intermediate shafts 34 and 35 is increased and a rotational speed of the other intermediate shafts 34 or 35 is decreased. Therefore, in case of carrying out an upshifting, the ball 4 is tilted in a manner to increase the rotational speed of the intermediate shaft transmitting the torque under the current speed change ratio, and to decrease the rotational speed of the intermediate shaft to transmit the torque under the target speed change ratio to be set.

Figure 1:
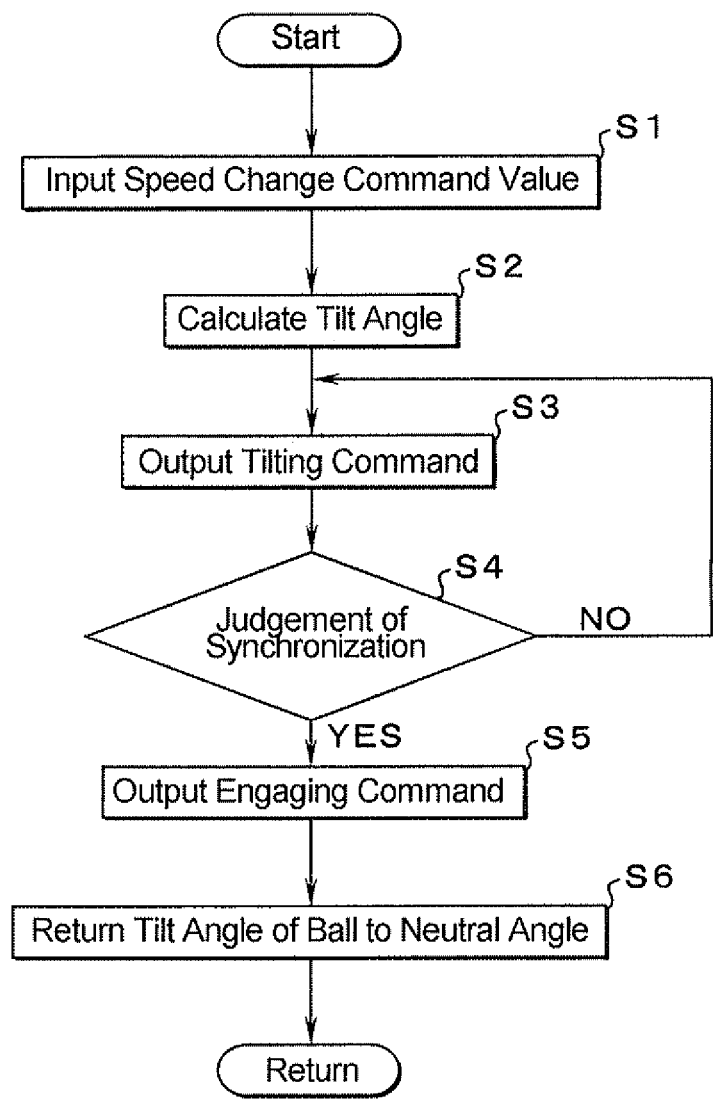
FIG. 1 is a flowchart explaining one example of a synchronous control to be carried out by the speed change control system according to the present invention.

An example of the above-described control is explained in a flowchart shown in FIG. 1. First of all, a speed change command value is inputted (at step S1). The speed change command value is a speed change ratio determined on the basis of a drive demand such as an opening degree of the accelerator and a driving condition of the vehicle such as a vehicle speed. As described, according to the example shown in FIG. 21, the geared transmission 30 is configured to set four stages as described, and those gear stages are adopted as the speed change command value. Then, a tilt angle of the ball 4 is calculated on the basis of the speed change command value (at step S2). As explained with reference to FIGS. 18 to 20, a direction of the speed change operation of the continuously variable transmission mechanism 1 is changed depending on a tilting direction of the ball 4, and a speed change ratio to be achieved is varied depending on a tilt angle of the ball 4. Therefore, a tilting direction and a tilt angle of the ball 4 are calculated at step S2.

Figure 2:
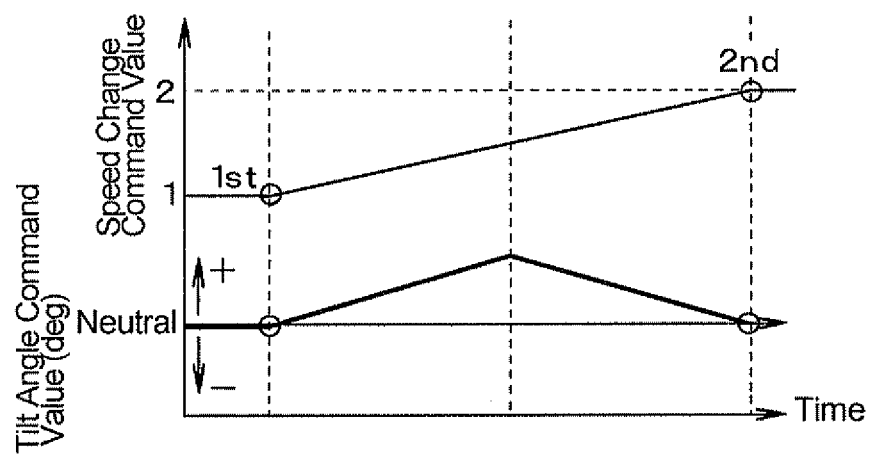
FIG. 2 is a graph indicating a relation between the speed change command value and the tilt angle command value during the synchronous control.

One example of obtaining the tilting direction and the tilt angle of the ball 4 will be explained with reference to FIG. 2. Specifically, an example of carrying out an upshifting from the first stage to the second stage is shown in FIG. 2. As indicated in FIG. 2, the speed change ratio of the continuously variable transmission mechanism 1 is set to "1" under the first stage where the torque is transmitted to the output shaft 42 via the first gear pair. This means that the support shaft 5 is not inclined in this situation so that the ball 4 is kept to a neutral angle. Therefore, the discs 25 and 26 are rotated at the same speeds. In this situation, the intermediate shafts 34 and 35 are also rotated at the same speeds. However, in this situation, the second drive gear 39 is rotated at a speed achieved by multiplying a rotational speed of the output shaft 42 by the gear ratio of the second gear pair. That is, the second dog clutch 41 on the second intermediate shaft 35 is rotated at a speed different from a rotational speed of the second drive gear 39 to be engaged therewith. More specifically, in this situation, the second intermediate shaft 35 is rotated at a speed higher than the rotational speed of the second drive gear 39. In order to synchronize those rotational speeds, the rotational speed of the second drive gear 39 has to be increased, and the rotational speed of the second dog clutch 41 has to be lowered. For this purpose, the ball 4 is tilted in the direction to increase a rotational speed of the second output disc 26 connected with the first intermediate shaft 34, and to decrease a rotational speed of the first output disc 25 connected with the second intermediate shaft 35. Specifically, in the example shown in the accompanying figures, the ball 4 is tilted in a manner to incline the support shaft 5 toward the right side. In this case, the ball 4 is tilted at an angle for setting the total speed change ratio of the transmission to a ratio between the speed change ratio achieved by the first gear pair and the speed change ratio achieved by the second gear pair (e.g., to a speed change ratio of "1.5"), under the condition where the torque is being transmitted through the first gear pair. The tilt angles at which the rotational speeds of the drive gear and the dog clutch are synchronized under each gear stage or under each speed change pattern can be prepared in advance as a map. As step S2, the tilt angle of the ball 4 is thus calculated or obtained with reference to the map.

At step S3, a command signal for tilting the ball 4 thus calculated is outputted. Then, it is judged whether or not the rotational speeds are synchronized (at step S4). That is, at step S4, it is judged whether or not the rotational speed of the transmission will not be fluctuated significantly even if a shifting operation of the switching mechanism such as the dog clutch is carried out. Such judgment of a synchronization of the rotational speeds can be carried out by directly detecting a rotational speed of the rotary member to be connected or disconnected by the switching mechanism. Alternatively, a synchronization of the rotational speeds may also be judged on the basis of a rotational speed of the other rotary element to be connected or disconnected by the switching mechanism. For example, the synchronization of the rotational speeds can be judged by comparing: a value obtained by multiplying a rotational speed of the output shaft 42 by a speed change ratio to be achieved after the speed change operation; with a rotational speed of the intermediate shaft to transmit the torque to the output shaft 42 after the speed change operation. More specifically, the synchronization of the rotational speeds can be judged by judging whether or not a value obtained by multiplying the rotational speed of the output shaft 42 by the gear ratio of the second gear pair becomes the rotational speed of the second intermediate shaft 35. In case the rotational speeds of the dog clutch and the drive gear have not yet been synchronized so that the answer of step S4 is NO, the control of step S3 is continued. To the contrary, in case the rotational speeds of the dog clutch and the drive gear have already been synchronized so that the answer of step S4 is YES, a command signal for engaging the dog clutch for setting the speed change ratio to be achieved after the speed change operation is outputted (at step S5). At the same time, a command signal for disengaging the dog clutch being engaged is outputted. Then, a command signal for returning the tilt angle of the ball 4 to the neutral angle is outputted (at step S6).

Figure 3:
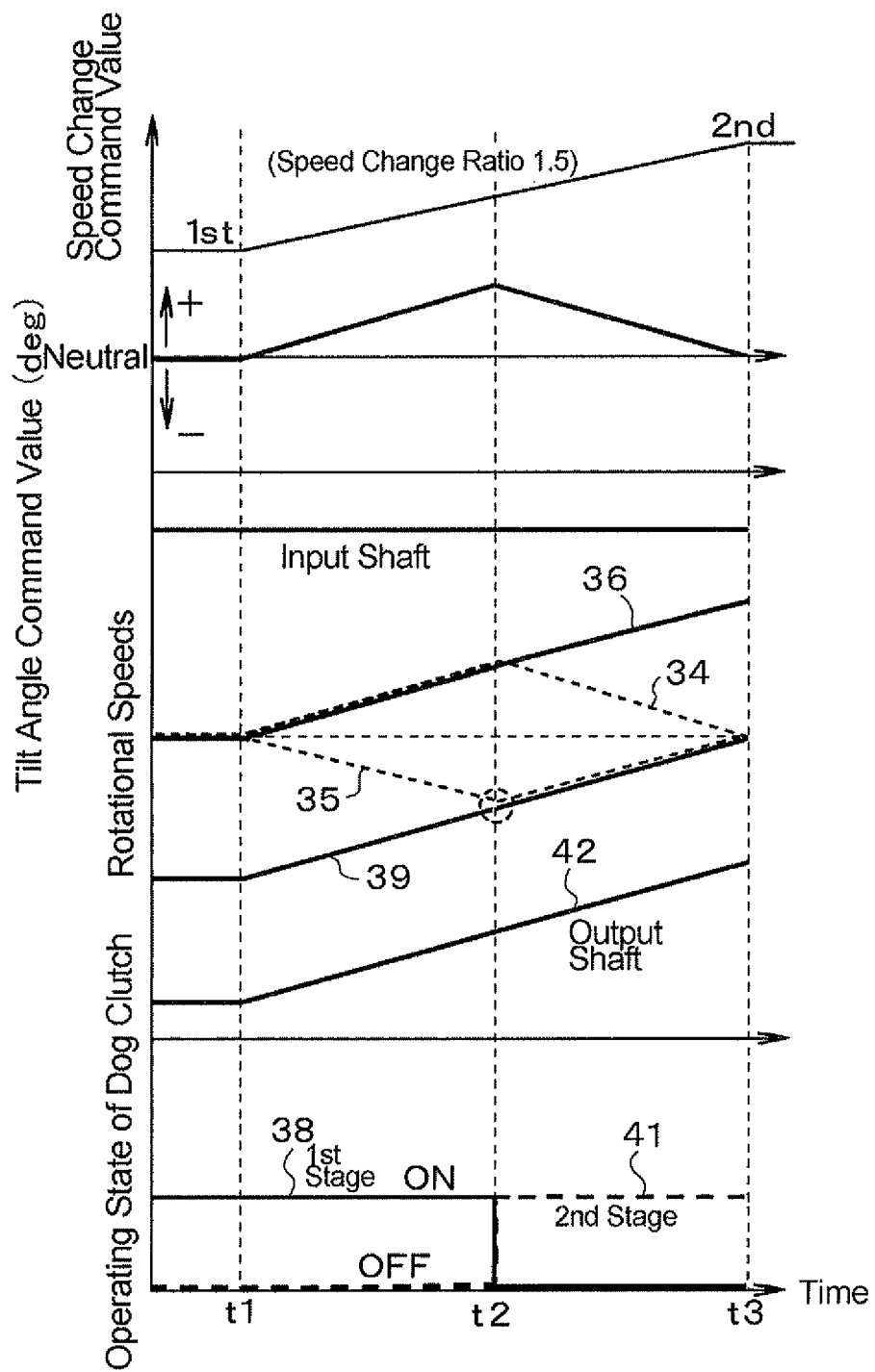
FIG. 3 is a time chart indicating changes of the speed change command value, the tilt angle command value, the rotational speeds, and operating states of dog clutches, during the synchronous control under an upshifting operation from the first stage to the second stage.

FIG. 3 is a time chart indicating changes in the speed change command value, the tilt angle command value, the rotational speeds, and the operating states of the dog clutches, in case the above-explained synchronous control is carried out during the upshifting from the first stage to the second stage. Under the first stage, the first dog clutch 38 is engaged with the first drive gear 36, and the second dog clutch 41 is disengaged (i.e., OFF state). In this situation, as indicated in FIG. 3, the intermediate shafts 34 and 35 and the first drive gear 36 are rotated at the same speed. Meanwhile, the second drive gear 39 is rotated at a speed achieved by multiplying the rotational speed of the output shaft 42 by the gear ratio of the second gear pair, which is lower than the rotational speed of the second intermediate shaft 35. When the judgment to carry out an upshifting to the second stage (at a point of time t1), the speed change command value is changed toward the speed change command value to achieve the second stage. In connection with such change in the speed change command value, a command signal for tilting the ball 4 is outputted. As a result, the ball 4 is tilted in a manner to allow the second output disc 26 to carry out an upshifting and to allow the first output disc 25 to carry out a downshifting. Consequently, the rotational speeds of the first intermediate shaft 34, the first drive gear 36 connected with the first intermediate shaft 34 by the first dog clutch 38, and the output shaft 42 are increased gradually, and the total speed change ratio of the transmission is thereby varied toward the second stage. In this situation, the rotational speed of the second drive gear 39 connected with the output shaft 42 is also increased gradually. To the contrary, the rotational speed of the second intermediate shaft 35 connected with the first output disc 25 is lowered gradually.

When the speed change ratio becomes an intermediate ratio between the speed change ratios of the first and the second stages which is to be called as "1.5 stage" (at a point of time t2), the rotational speed of the second intermediate shaft 35, that is, the rotational speed of the second dog clutch 41 is almost synchronized with the rotational speed of the second drive gear 39 to be engaged therewith. In this situation, a difference between those rotational speeds becomes smaller than a predetermined value. That is, those rotational speeds are synchronized with each other. Therefore, the second dog clutch 41 is engaged with the second drive gear 39 at the point of time t2. At the same time, the first dog clutch 38 is disengaged from the first drive gear 36. Then, the tilt angle of the ball 4 is returned to the neutral angle. Consequently, in the continuously variable transmission mechanism 1, an upshifting is carried out in the first output disc 25 side, and a downshifting is carried out in the second output disc 26 side. As a result, the rotational speed of the first intermediate shaft 34 is lowered gradually, and the rotational speeds of the second intermediate shaft 35, the second drive gear 39 connected therewith, and the output shaft 42 are increased gradually. In addition, the tilt angle of the ball 4 is returned to the neutral angle in this situation so that the speed change ratio of the continuously variable transmission mechanism 1 becomes "1". As a result, the total speed change ratio of the transmission becomes a speed change ratio for setting the second stage (at a point of time t3), and the speed change operation is completed.

A speed change operation between the second and the third stages, and a speed change operation between the third and the fourth stages are also carried out by the above-explained procedure of carrying out the speed change operation between the first and the second stages. As described, in case of shifting the gear stage from the first stage to the second stage, the intermediate shaft to transmit the torque to the output shaft 42 is shifted from the first intermediate shaft 34 to the second intermediate shaft 35. However, in case of shifting the gear stage from the second stage to the third stage, the intermediate shaft to transmit the torque to the output shaft 42 is shifted from the second intermediate shaft 35 to the first intermediate shaft 34. Thus, in case of shifting the gear stage from the second stage to the third stage, the intermediate shaft to be used to transmit the torque is shifted in the direction opposite to the direction of the case in which the gear stage is shifted from the first stage to the second stage or from the third stage to the fourth stage. Therefore, in case of shifting the gear stage from the second stage to the third stage, the ball 4 is tilted in the direction opposite to the direction of the case in which the gear stage is shifted from the first stage to the second stage, and the dog clutches are also engaged and disengaged in the opposite way.

Figure 4:
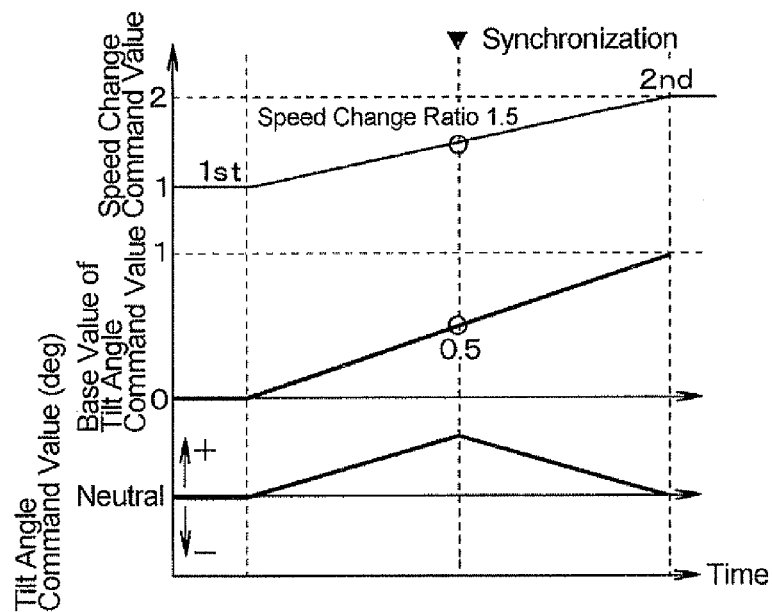
FIG. 4 is a graph indicating one example of the tilt angle command value based on a base value of the tilt angle command value.

In case of carrying out the above-explained synchronous control, the command signal for tilting the ball 4 is outputted in accordance with the speed change command value. For this purpose, it is preferable to set a base value of the tilt angle command value in accordance with the speed change command value, and to output the tilt angle command value according to the speed change command value, on the basis of the base value. For example, as indicated in FIG. 4, the base value of the tilt angle command value in the beginning of the synchronous control is set to "0". The base value of the tilt angle command value for the period of time when the above-explained rotational speeds are synchronized is set to "0.5", and the base value of the tilt angle command value for the period of time when the speed change operation is completed is set to "1". In addition, a function for calculating the tilt angle command value corresponding to the base value of the tilt angle command value is prepared in advance. Specifically, the function is configured to change a direction of changing the tilt angle of the ball 4 before the synchronization and after the synchronization.

Figure 5:
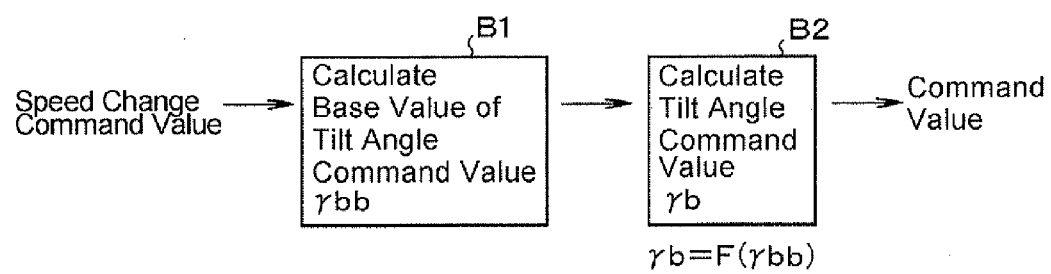
FIG. 5 is a block diagram showing one example of control blocks for carrying out the control shown in FIG. 4.

FIG. 5 is a block diagram showing such a control system. As shown in FIG. 5, the speed change command value is inputted to a base value calculation device B1. For example, the base value calculation device B1 is adapted to calculate a base value γbb of the tilt angle command value which is determined in advance to achieve the relation indicated in FIG. 4. On the other hand, a tilt angle command value calculation device B2 is adapted to obtain a tilt angle command value γb (=F(γbb)) on the basis of the base value γbb of the tilt angle command value and the function prepared in advance. According to the example shown in FIG. 5, in case the speed change command value is "1", the tilt angle command value γb is set to "0". In case the speed change command value is "1.2", the tilt angle command value γb is set to "0.2" in accordance with the increment "0.2" of the speed change command value. In case the speed change command value is "1.5", the tilt angle command value γb is set to "0.5" thereby achieving the above-explained synchronization of the rotational speeds. In case the speed change command value is "1.8", the tilt angle command value γb is set to "0.2" in accordance with the reduction "0.3" of the speed change command value. In case the speed change command value is "2", the tilt angle command value γb is set to "0". Thus, the tilt angle command value can be obtained in accordance with the speed change command value by a simple calculation. For this reason, a complicated map or the like is unnecessary to be prepared in advance. That is, in case of using an electronic control unit, a memory capacity can be reduced so that the cost of the electronic control unit can be lowered.

In case of outputting the tilt angle command signal, the tilt angle of the ball 4 may be changed uniformly as explained. Alternatively, it is also possible to change an increasing rate of the tilt angle during a process of synchronization of the rotational speeds. In other words, a change rate of the speed change ratio may be changed during a process of synchronization of the rotational speeds. In case of engaging the dog clutch 38 or 41, it is preferable to eliminate a difference between the rotational speed of the dog clutch 38 or 41 and the rotational speed of the drive gear to be engaged therewith. However, it is difficult to eliminate the difference in the rotational speeds of those members completely. If the dog clutch 38 or 41 is engaged with the drive gear when the difference in the rotational speed therebetween is almost zero, the speed change operation may be delayed significantly.

Figure 6:
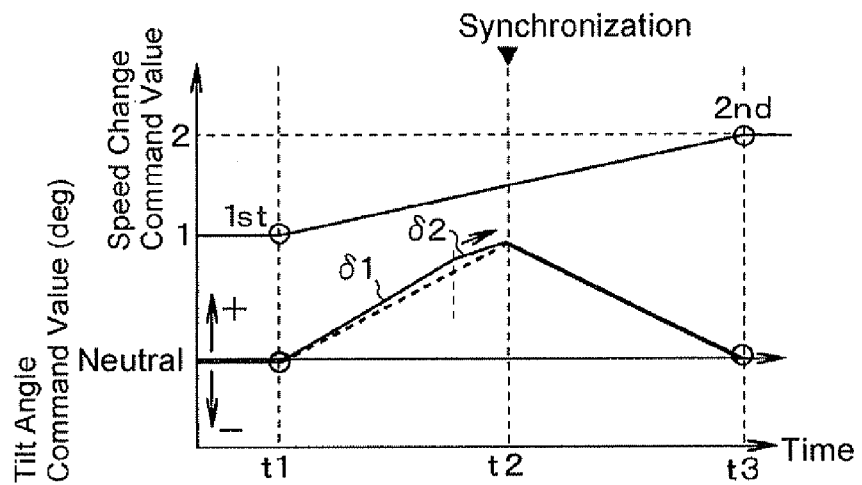
FIG. 6 is a graph indicating one example of reducing a gradient of the tilt angle command value just before the synchronization.

Therefore, in case of synchronizing the rotational speeds of the dog clutch and the drive gear to be engaged therewith while tilting the ball 4, a tilting speed of the ball 4 is increased in the beginning, and decreased just before the synchronization of the rotational speeds of the above-mentioned members. An example of this kind of control is shown in FIG. 6. As indicated in FIG. 6, in the beginning of the synchronous control, a gradient δ1 of the tilt angle command value is steeper than the gradient of the case in which the tilt angle command value is changed uniformly to the period of time when the rotational speeds are synchronized. That is, the tilting speed of the ball 4 is higher in the beginning of the synchronous control. However, when the rotational speeds of the above-mentioned members are almost synchronized, in other words, just before a synchronization of the rotational speeds of the above-mentioned members, an increasing rate of the tilt angle command value is moderated. Specifically, as can be seen from FIG. 6, a gradient δ2 of the tilt angle command value is lower than the gradient δ1, and also lower than the gradient of the case in which the tilt angle command value is increased uniformly to the period of time when the rotational speeds are synchronized. The functional means for carrying out the control of thus changing the tilting speed corresponds to the synchronous speed control means of the present invention.

Therefore, even if a judgment of the synchronization of the rotational speeds of the switching mechanism such as the dog clutch and the drive gear to be engaged therewith is satisfied but the dog clutch and the drive gear are rotated at different speeds, the difference in those rotational speeds is eliminated sufficiently by carrying out the control of the tilt angle command value as shown in FIG. 6. Therefore, shocks resulting from engaging the dog clutch with the drive gear can be prevented or reduced sufficiently.

However, a possibility of occurrence of the shocks resulting from engaging the dog clutch with the drive gear and an effect of the shocks are varied depending on a driving condition of the vehicle, a running environment etc. Therefore, a degree of lowering the gradient of changing the tilt angle command value just before the synchronization of the rotational speeds, in other words, a degree of moderating a changing rate of the speed change ratio just before the synchronization, is preferably adjusted depending on a situation of the vehicle. An example of such control will be explained hereinafter.

Figure 7:
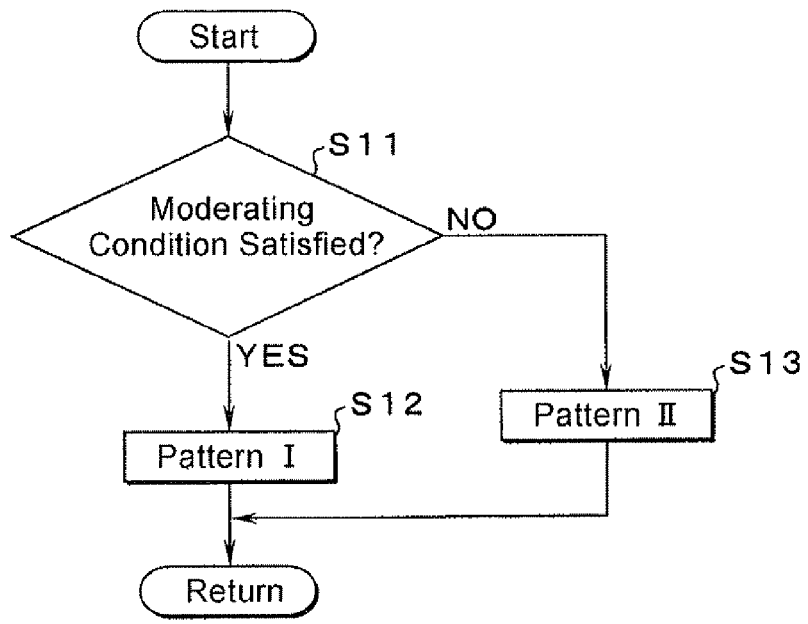
FIG. 7 is a flowchart explaining the control for changing the gradient of the tilt angle command value just before the synchronization.

FIG. 7 is a flowchart explaining an example of selecting a pattern of changing the tilt angle command value during a process of synchronizing the rotational speeds of the dog clutch and the drive gear, depending on a satisfaction of a condition to lower the gradient of changing the tilt angle command value just before the synchronization during the synchronous control, that is, depending on a satisfaction of a condition to moderate the changing rate of the speed change ratio just before the synchronization during the synchronous control (i.e., satisfaction of a moderating condition). As shown in FIG. 7, first of all, it is judged whether or not the above-explained moderating condition is satisfied (at step S11). An example of the moderating condition will be explained later. In case the moderating condition is satisfied so that the answer of step S11 is YES, pattern I for changing the tilt angle command value is selected (at step S12). Specifically, according to the pattern I, the gradient of the tilt angle command value is relatively steeper in the beginning of the synchronous control, and relatively gently just before the synchronization. To the contrary, in case the moderating condition is not satisfied so that the answer of step S11 is NO, pattern II is selected (at step S13). Specifically, according to the pattern II, the gradient of the tilt angle command value is also reduced just before the synchronization to be more gently in comparison with the gradient at the beginning of the synchronous control. However, according to the pattern II, the gradient of the tilt angle command value in the beginning of the synchronous control is more gently in comparison with that of the pattern I, therefore, the gradient of the tilt angle command value just before the synchronization is steeper than that of the pattern I.

Figure 8:
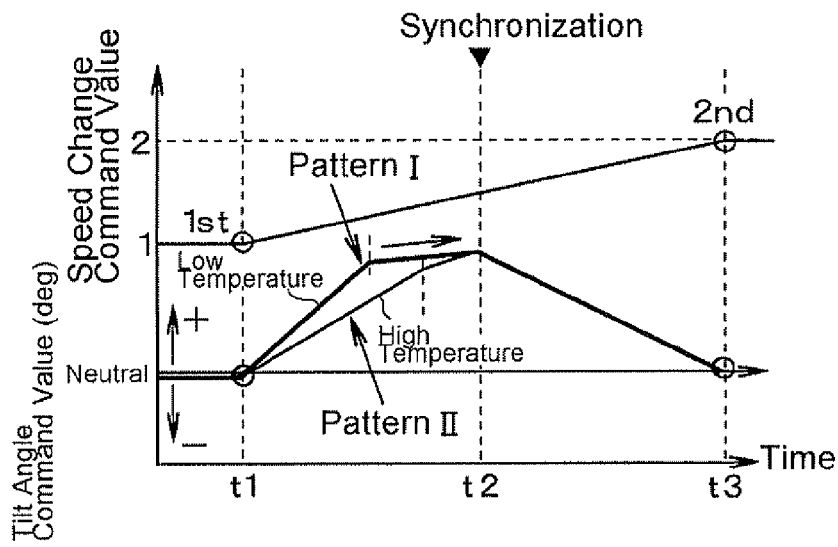
FIG. 8 is a graph indicating patterns of changing the tilt angle command value just before the synchronization in case of changing the gradient of the tilt angle command value depending on an oil temperature.

For example, a satisfaction of the moderating condition is judged at step S11 on the basis of a fact that an oil temperature in the transmission is low. In this case, the moderating condition is satisfied if a temperature detected by an oil temperature detecting means such as an oil temperature sensor (not shown) is lower than a preset reference temperature. The pattern I to be selected in case the detected temperature is low, and the pattern II to be selected in case the detected temperature is high are shown in FIG. 8. According to the control example shown in FIG. 8, even if the control of tilting the ball 4 or a movement of the ball 4 is disturbed by a large friction resulting from an insufficient oil temperature, a difference in the rotational speeds of the switching mechanism and the members to be engaged therewith can be eliminated sufficiently when engaging those members. Therefore, shocks resulting from engaging the switching mechanism with the member to be engaged can be prevented or reduced.

Alternatively, a satisfaction of the moderating condition can be judged at step S11 on the basis of a fact that an engine load (i.e., an output torque of the engine) is low. Specifically, in case the engine load is low, an acceleration of the vehicle is poor. In this case, an acceleration caused by an inertia torque resulting from an engagement of the switching mechanism and so on can be sensed easily. Therefore, at step S11, it is judged whether or not the load is low, by a load detecting means adapted to detect the load on the basis of an opening degree of the accelerator or on the basis of an output value of a torque sensor (not shown). In case the answer of step S11 is YES, the pattern I is selected (at step S12). To the contrary, in case the load is high so that the answer of step S11 is NO, the pattern II is selected (at step S13).

Figure 9:
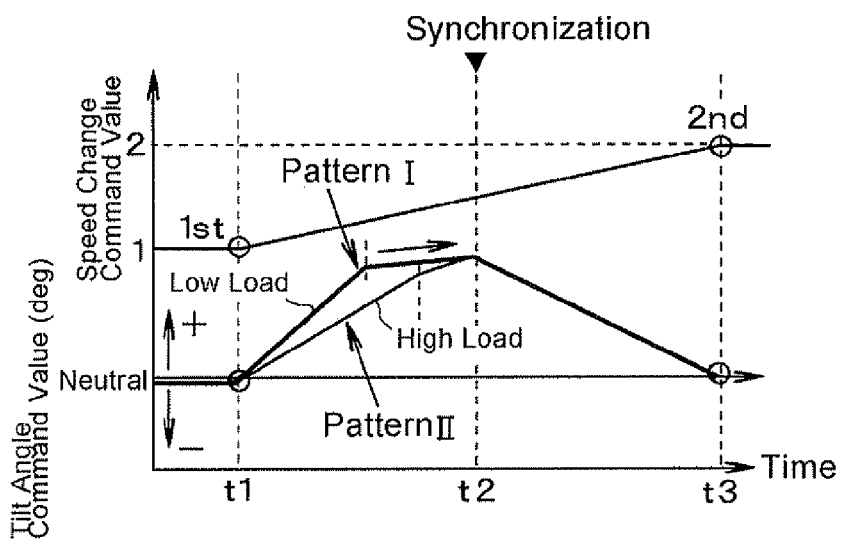
FIG. 9 is a graph indicating patterns of changing the tilt angle command value just before the synchronization in case of changing the gradient of the tilt angle command value depending on an engine load.

The patterns I and II to be selected depending on the engine load are shown in FIG. 9. In case the load is low so that the pattern I is selected, the gradient δ2 of the tilt angle command value is lowered just before the synchronization of the rotational speeds of the members to be engaged. Therefore, even if a difference in the rotational speeds are to be eliminated by engaging the switching mechanism with the drive gear, the difference in the rotational speeds therebetween is thus reduced in advance so that the inertia torque resulting from eliminating the difference in the rotational speeds can be reduced. As a result, the shocks caused by the inertia torque can be reduced to the level which is hard to be sensed, and even if the shocks thus reduced is sensed, the sensed shocks will not provide an uncomfortable feeling. To the contrary, in case the load is high so that the pattern II is selected, the gradient δ2 of the tilt angle command value just before the synchronization of the rotational speeds is steeper then that of the pattern I. Therefore, even if the shocks are caused by engaging the switching mechanism with the drive gear, the acceleration of the vehicle is high so that the shocks are hard to be sensed. For this reason, an uncomfortable feeling will not be caused.

In addition, a satisfaction of the moderating condition can also be judged at step S11 on the basis of a fact that a rotational speed of the engine (i.e., an input speed to the transmission) is high. Specifically, in case the engine is driven at high speed, the rotational speed may be fluctuated significantly when the switching mechanism is shifted to be engaged with the drive gear, and this may increase an inertia torque. Therefore, at step S11, it is judged whether or not the rotational speed of the engine is high, by a speed detecting means adapted to detect the engine speed on the basis of an output value of an engine speed sensor (not shown) and so on. In case the answer of step S11 is YES, the pattern I is selected (at step S12). To the contrary, in case the engine speed is low so that the answer of step S11 is NO, the pattern II is selected (at step S13).

Figure 10:
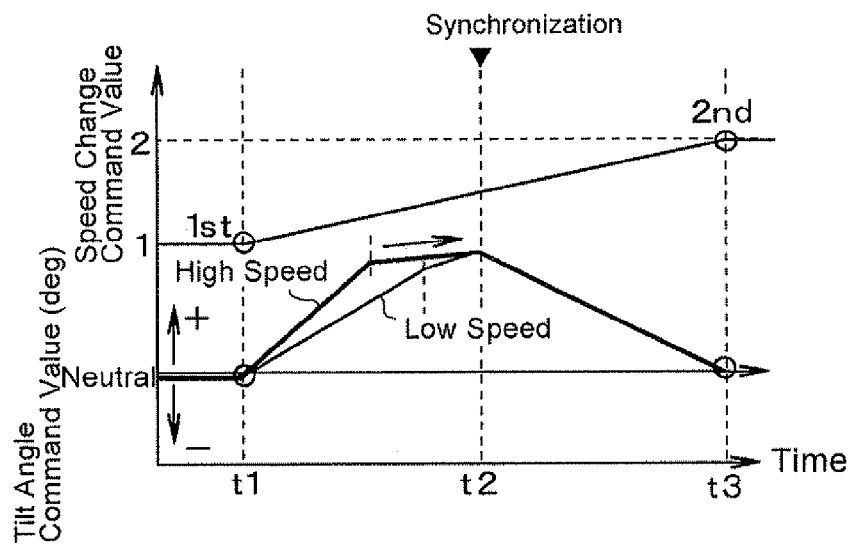
FIG. 10 is a graph indicating patterns of changing the tilt angle command value just before the synchronization in case of changing the gradient of the tilt angle command value depending on an engine speed.

The patterns I and II to be selected depending on the engine speed are shown in FIG. 10. In case the engine speed is high so that the pattern I is selected, the gradient δ2 of the tilt angle command value is lowered just before the synchronization of the rotational speeds of the members to be engaged. Therefore, even if a difference in the rotational speeds are to be eliminated by engaging the switching mechanism with the drive gear, the difference in the rotational speeds therebetween is thus reduced in advance so that the inertia torque resulting from eliminating the difference in the rotational speeds can be reduced. As a result, the shocks caused by the inertia torque can be reduced to the level which is hard to be sensed, and even if the shocks thus reduced is sensed, the sensed shocks will not provide an uncomfortable feeling. To the contrary, in case the engine speed is low so that the pattern II is selected, the gradient δ2 of the tilt angle command value just before the synchronization of the rotational speeds is steeper then that of the pattern I. Therefore, even if a difference in the rotational speeds is eliminated by engaging the switching mechanism with the drive gear, the engine speed is low in this case so that the difference between the rotational speeds is reduced in advance. For this reason, the inertia torque and the shocks resulting from the inertia torque can be reduced so that an uncomfortable feeling will not be caused.

Moreover, according to the present invention, a satisfaction of the moderating condition can also be judged on the basis of a selected driving mode. Specifically, a satisfaction of the moderating condition can be judged on the basis of a fact that the snow mode is selected. Under the snow mode, the drive torque is reduced relatively. Alternatively, under the snow mode, the speed change ratio is shifted to the relatively high speed side when the vehicle is started thereby reducing the drive torque relatively. Specifically, at step S11 shown in FIG. 7, it is judged whether or not the snow mode is selected by a mode shifting means such as a mode selecting switch (not shown). In case the answer of step S11 is YES, the pattern I is selected (at step S12). To the contrary, in case the snow mode is not selected so that the answer of step S11 is NO, the pattern II is selected (at step S13).

Figure 11:
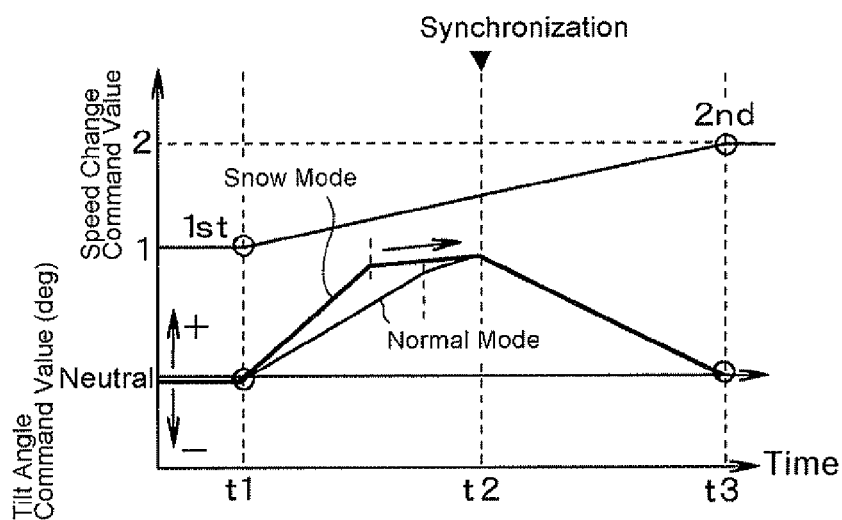
FIG. 11 is a graph indicating patterns of changing the tilt angle command value just before the synchronization in case of changing the gradient of the tilt angle command value depending on a driving mode.

The patterns I and II to be selected depending on the fact that the snow mode is selected are shown in FIG. 11. In case the snow mode is selected so that the pattern I is selected, the gradient δ2 of the tilt angle command value is lowered just before the synchronization of the rotational speeds of the members to be engaged. Therefore, even if a difference in the rotational speeds are to be eliminated by engaging the switching mechanism with the drive gear, the difference in the rotational speeds is thus reduced in advance so that the inertia torque resulting from eliminating the difference in the rotational speeds can be reduced. To the contrary, in case normal mode is selected, that is, in case the snow mode is not selected, the answer of step S11 is NO so that the pattern II is selected. In this case, the gradient δ2 of the tilt angle command value just before the synchronization of the rotational speeds is steeper then that of the pattern I. Consequently, the inertia torque resulting from eliminating a difference in the rotational speeds by engaging the switching mechanism with the drive gear becomes relatively larger. Therefore, if a road surface is slippery and the snow mode is selected, a fluctuation in the drive torque resulting from engaging the switching mechanism with the drive gear when the rotational speeds of those members are synchronized can be reduced so that a slippage of tires can be avoided. To the contrary, in case a coefficient of friction on a road surface is relatively large, the normal mode is selected. In this case, since the coefficient of friction on the road surface is relatively large, a slippage of tires will not occur even if a drive torque is fluctuated significantly by a relatively large inertia torque resulting from engaging the switching mechanism with the drive gear when the rotational speeds of those members are synchronized. Therefore, a delay in the synchronization of the rotational speeds, and a delay in the speed change operation can be avoided under the condition where the coefficient of friction on the road surface is large.

Further, according to the present invention, a satisfaction of the moderating condition can also be judged on the basis of a fact that a gear stage (i.e., a speed change ratio) of the geared transmission 30 is a low gear stage. Specifically, a satisfaction of the moderating condition can be judged on the basis of a fact that the first stage or the second stage is set in the geared transmission 30. In this case, it is judged whether or not the low gear stage is being set in the geared transmission 30 at step S11 shown in FIG. 7. In case the low gear stage is being set in the geared transmission 30 so that the answer of step S11 is YES, the pattern I is selected (at step S12). To the contrary, in case a high gear stage is being set in the geared transmission 30 so that the answer of step S11 is NO, the pattern II is selected (at step S13).

Figure 12:
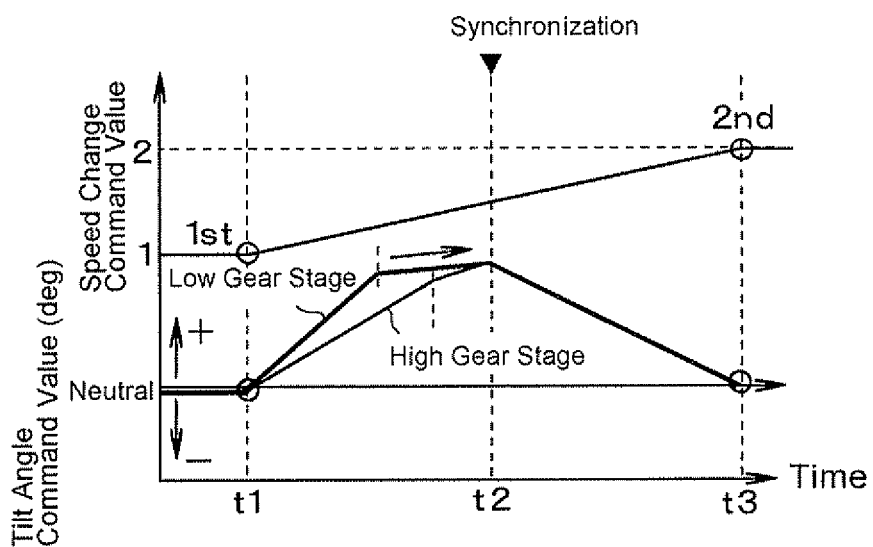
FIG. 12 is a graph indicating patterns of changing the tilt angle command value just before the synchronization in case of changing the gradient of the tilt angle command value depending on a speed change ratio of the geared transmission mechanism.

The patterns I and II to be selected depending on the gear stage of the geared transmission 30 are shown in FIG. 12. As shown in FIG. 12, in case the low gear stage is set in the geared transmission 30 so that the pattern I is selected, the gradient δ2 of the tilt angle command value is lowered just before the synchronization of the rotational speeds of the switching mechanism and the drive gear. Consequently, the difference between the rotational speeds of the switching mechanism and the drive gear is reduced before eliminated by engaging those members. That is, a change rate of the rotational speeds of the switching mechanism and the drive gear at the time of synchronization can be reduced in this case. Therefore, the rotational speed of the engine 50 can be prevented from being raised transiently under the low gear stage, in other words, an abrupt rise of the engine speed can be prevented even under the low gear stage. For this reason, an inertia torque resulting from a fluctuation of the rotational speed can be reduced so that an occurrence of shocks can be prevented. To the contrary, in case the high gear stage is being set so that the answer of step S11 is NO, the pattern II is selected. In this case, the gradient δ2 of the tilt angle command value just before the synchronization of the above-mentioned rotational speeds is steeper then that of the pattern I. Essentially, the rise of the engine speed is relatively small under the high gear stage so that the shocks will not be deteriorated in this case. In addition, a delay in the synchronization of the rotational speeds, and a delay in the speed change operation can be avoided.

Furthermore, according to the present invention, a satisfaction of the moderating condition can also be judged on the basis of an increasing rate of the rotational speed of the engine 50 during the speed change operation. For example, a satisfaction of the moderating condition can be judged on the basis of a fact that an opening degree of the accelerator is wide so that the rotational speed of the engine 50 is being raised abruptly. In this case, it is judged whether or not the increasing rate (i.e., an increasing gradient) of the rotational speed of the engine 50 is larger than a preset value at step S11 shown in FIG. 7. In case the answer of step S11 is YES, the pattern I is selected (at step S12). To the contrary, in case the increasing rate of the rotational speed of the engine 50 is smaller than the preset value so that the answer of step S11 is NO, the pattern II is selected (at step S13).

Figure 13:
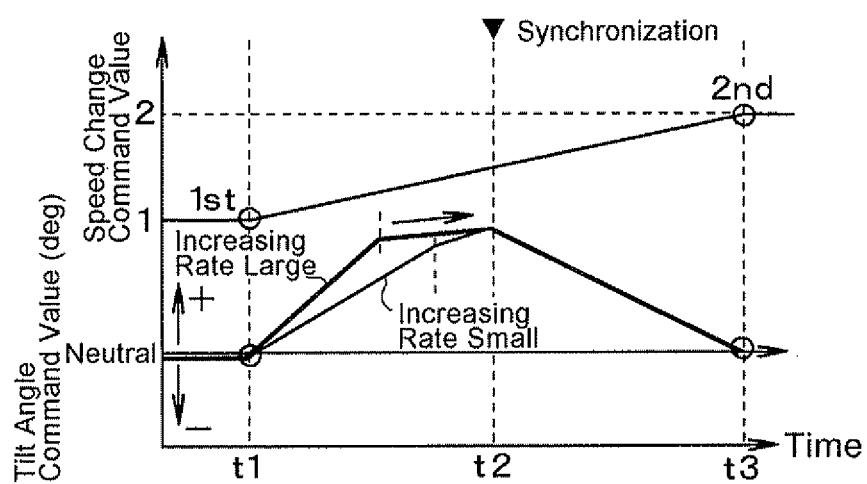
FIG. 13 is a graph indicating patterns of changing the tilt angle command value just before the synchronization in case of changing the gradient of the tilt angle command value depending on an increasing rate of the rotational speed of the engine.

The patterns I and II to be selected depending on the increasing rate of the rotational speed of the engine 50 are shown in FIG. 13. As shown in FIG. 13, in case the increasing rate of the rotational speed of the engine 50 is larger than the preset value so that the pattern I is selected, the gradient δ2 of the tilt angle command value is reduced just before the synchronization of the rotational speeds of the switching mechanism and the drive gear. Consequently, the difference between the rotational speeds of the switching mechanism and the drive gear is reduced before eliminated by engaging those members. That is, a change rate of the rotational speed at the time of synchronization can be reduced even if the increasing rate of the rotational speed of the engine 50 is large. Therefore, an inertia torque resulting from a fluctuation of the rotational speed can be reduced so that an occurrence of shocks can be prevented. To the contrary, in case the increasing rate of the rotational speed of the engine 50 is smaller than the preset value so that the answer of step S11 is NO, the pattern II is selected. In this case, the gradient δ2 of the tilt angle command value just before the synchronization of the above-mentioned rotational speeds is steeper then that of the pattern I. As described, the increasing rate of the rotational speed of the engine 50 is small in this case, therefore, change in the rotational speeds at the time of synchronization is small so that the shocks will not be deteriorated in this case. In addition, a delay in the synchronization of the rotational speeds, and a delay in the speed change operation can be avoided.

Figure 14:
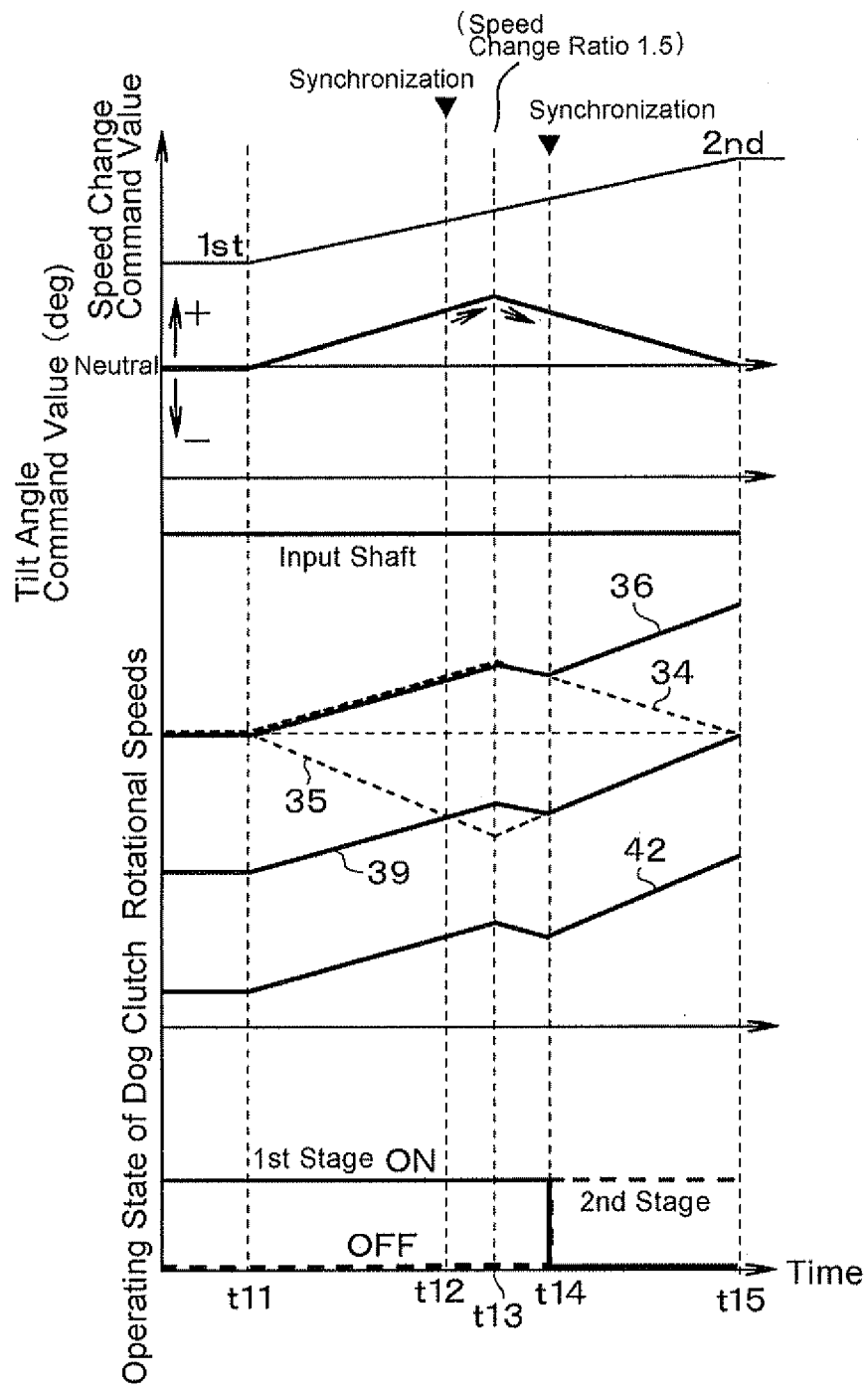
FIG. 14 is a time chart indicating changes of the speed change command value, the tilt angle command value, the rotational speeds, and operating states of dog clutches, during a control of varying the tilt angle to the angle larger than the tilt angle at which said rotational speeds are synchronized, and thereafter returning the tilt angle to the angle at which said rotational speeds are synchronized.

According to the present invention, an occurrence of shocks can be prevented or avoided by increasing the tilt angle of the ball 4 to the angle larger than the tilt angle at which the synchronization of the rotational speeds of the switching mechanism and the drive gear is achieved, and then returning to the angle at which the synchronization of the above-mentioned rotational speeds is achieved, instead of changing the changing rate of the tilt angle of the ball 4 as explained above. FIG. 14 is a time chart indicating changes of the speed change command value, the tilt angle command value, the rotational speeds, and the operating states of the dog clutches, in case the above-explained control is carried out when shifting the gear stage from the first stage to the second stage. Under the first stage, the first dog clutch 38 is engaged with the first drive gear 36, and the second dog clutch 41 is disengaged (i.e., OFF state). In this situation, the intermediate shafts 34 and 35, and the first drive gear 36 are rotated at the same speed. Meanwhile, the second drive gear 39 is rotated at a speed achieved by multiplying the rotational speed of the output shaft 42 by the gear ratio of the second gear pair, which is lower than the rotational speed of the second intermediate shaft 35. When the judgment to carry out an upshifting to the second stage is satisfied (at a point of time t11), the speed change command value is changed to the value for achieving the second stage. In connection with such change in the speed change command value, a command signal for tilting the ball 4 is outputted. As a result, the ball 4 is tilted in a manner to allow the second output disc 26 to carry out an upshifting and to allow the first output disc 25 to carry out a downshifting. Consequently, the rotational speeds of the first intermediate shaft 34, the first drive gear 36 connected with the first intermediate shaft 34 by the first dog clutch 38, and the output shaft 42 are increased gradually, and the total speed change ratio of the transmission is thereby varied toward the second stage. In this situation, the rotational speed of the second drive gear 39 connected with the output shaft 42 is also increased. To the contrary, the rotational speed of the second intermediate shaft 35 connected with the first output disc 25 is lowered gradually.

During the above-explained process, the rotational speed of the second intermediate shaft 35 and the rotational speed of the second drive gear 39 are synchronized with each other (at a point of time t12). That is, the synchronization is once achieved. Such synchronization of the rotational speeds can be judged on the basis of the rotational speed of the second intermediate shaft 35 or the rotational speed of the output shaft 42. The tilt angle of the ball 4 is further increased afterward, and when the speed change ratio becomes an intermediate ratio between the first stage and the second stage (at a point of time t13), the direction to tilt the ball 4 is turned to decrease the tilt angle of the ball 4 gradually. As a result, the rotational speeds of the first intermediate shaft 34, the first drive gear 36 connected therewith, and the output shaft 42 are lowered. In this situation, the rotational speed of the second drive gear 39 is also lowered. To the contrary, the rotational speed of the second intermediate shaft 35 is increased. Therefore, the rotational speed of the second intermediate shaft 35 (i.e., the rotational speed of the second dog clutch 41), and the rotational speed of the second drive gear 39 to be engaged therewith are synchronized with each other again. That is, the synchronization is achieved again (at a point of time t14).

When the rotational speeds of the second intermediate shaft 35 and the second drive gear 39 are thus synchronized again, the second dog clutch 41 is shifted to be engaged with the second drive gear 39 thereby connecting the second intermediate shaft 35 with the second drive gear 39. Then, the tilt angle of the ball 4 is returned to the neutral angle. Therefore, in the continuously variable transmission mechanism 1, the upshifting is further progressed in the first output disc 25 side, and the downshifting is further progressed in the second output disc 26 side. Consequently, the rotational speed of the first intermediate shaft 34 is lowered gradually, and the rotational speeds of the second intermediate shaft 35, the second drive gear 39 connected therewith, and the output shaft 42 are increased gradually. In this situation, the tilt angle of the ball 4 is returned to the neutral angle in this situation so that the speed change ratio of the continuously variable transmission mechanism 1 becomes "1". As a result, the total speed change ratio of the transmission becomes a speed change ratio for setting the second stage (at a point of time t15), and the speed change operation is completed.

A speed change operation between the second and the third stages, and a speed change operation between the third and the fourth stages are also carried out by the above-explained procedure of the speed change operation between the first and the second stages. As described, in case of shifting the gear stage from the first stage to the second stage, the intermediate shaft to transmit the torque to the output shaft 42 is shifted from the first intermediate shaft 34 to the second intermediate shaft 35. However, in case of shifting the gear stage from the second stage to the third stage, the intermediate shaft to transmit the torque to the output shaft 42 is shifted from the second intermediate shaft 35 to the first intermediate shaft 34. Thus, in case of shifting the gear stage from the second stage to the third stage, the intermediate shaft to be used to transmit the torque is shifted in the direction opposite to the case in which the gear stage is shifted from the first stage to the second stage, and the case in which the gear stage is shifted from the third stage to the fourth stage. Therefore, in case of shifting the gear stage from the second stage to the third stage, the ball 4 is tilted in the direction opposite to the case in which the gear stage is shifted from the first stage to the second stage, and the dog clutches are also engaged and disengaged in the opposite way.

In case of carrying out the control for changing the tilt angle of the ball 4 as shown in FIG. 14, the synchronization of the rotational speeds can be detected certainly, that is, a detection accuracy of the synchronization of the rotational speeds can be improved. Therefore, a timing of engaging the switching mechanism with the drive gear will not be lagged so that an occurrence of shocks can be prevented or avoided. In addition, it is unnecessary to vary the change rate of the tilt angle of the ball 4 so that the change rate of the tilt angle of the ball 4 can be set to a constant rate. Therefore, a delay in the synchronization of the rotational speeds, and a delay in the speed change operation can be prevented or avoided.

Here will be briefly explained a relation between the present invention and the examples thus far explained. As to FIG. 1, a functional means for carrying out the control of steps S2 and S3 corresponds to the synchronization command means of the present invention, a functional means for carrying out the control of steps S4 and S5 corresponds to the speed change execution means of the present invention, a functional means for carrying out the control of step S6 corresponds to the returning means or the neutral command means of the present invention, and a functional means for carrying out the control of step S1 corresponds to the speed change command means of the present invention. As to FIG. 7, a functional means for carrying out the control of steps S12 and S13 corresponds to the tilt angle control means of the present invention.

The geared transmission mechanism of the present invention should not be limited to be composed mainly of the gear pairs provided for setting the gear stages. For example, the geared transmission mechanism may also be composed mainly of a plurality of planetary gear mechanisms and engagement mechanisms for selectively connecting and halting rotary elements of the planetary gear mechanisms. In addition, the mechanism for tilting the rolling member of the continuously variable transmission mechanism should not be limited to the above-explained hydraulic type mechanism. For example, a mechanism configured to move the rolling member back and forth by a ball screw or a cam mechanism may also be used to tilt the rolling member. Further, the switching mechanism of the present invention should not be limited to the dog clutch. For example, an engagement mechanism having a synchronizing function or a frictional clutch may also be used as the switching mechanism.

The invention claimed is:
1. A speed change control system for a transmission of vehicle, in which a continuously variable transmission mechanism configured to vary a speed change ratio continuously and a geared transmission mechanism configured to change a speed change ratio stepwise are connected in series, wherein:
the continuously variable transmission mechanism comprises
a first rotary member which rotates around a center axis, a rolling member having a smooth outer face, which is contacted with an outer circumferential face of the first rotary member in a manner to transmit a torque therebetween and in a manner to tilt a rotational center axis thereof, and a second rotary member and a third rotary member, which are contacted with the outer face of the rolling member in a torque transmittable manner at a side opposite to a side to which the first rotary member is contacted across the rotational center axis of the rolling member, and which are adapted to rotate relatively with the first rotary member;

the geared transmission comprises a first intermediate shaft connected with the second rotary member, a second intermediate shaft connected with the third rotary member, an output member, which is connected selectively with the first intermediate shaft and the second intermediate shaft in a torque transmittable manner, a first transmission mechanism, which is arranged between the first intermediate shaft and the output member, and which is adapted to set a ratio between rotational speeds of the first intermediate shaft and the output member to a predetermined ratio, a first switching mechanism, which is adapted to allow and to disable the first transmission mechanism to transmit the torque selectively, a second transmission mechanism, which is arranged between the second intermediate shaft and the output member, and which is adapted to set a ratio between rotational speeds of the second intermediate shaft and the output member to a ratio different from the ratio set by the first transmission mechanism, and a second switching mechanism, which is adapted to allow and to disable the second transmission mechanism to transmit the torque selectively;

the speed change control system further comprising:

a synchronization command means, which is adapted to tilt a rotational center axis of the rolling member, thereby synchronizing a rotational speed of one of the first and the second switching mechanism with a rotational speed of a member to be engaged therewith, when carrying out a speed change operation by engaging said one of the switching mechanisms being disengaged with the member to be engaged therewith; and a speed change execution means, which is adapted to shift said one of the switching mechanisms thereby engaging said one of the switching mechanisms with the member to be engaged therewith, when a difference between the rotational speed of said one of the switching mechanisms and the rotational speed of the member to be engaged therewith becomes smaller than a preset value.

2. The speed change control system for a transmission of vehicle as claimed in claim 1, further comprising:

a returning means, which is adapted to return the rotational center axis of the rolling member to a condition in which the rotational speed of the second rolling member and the rotational speed of the third rotary member are equalized, after said one of the switching mechanisms is engaged with the member to be engaged therewith.

3. The speed change control system for a transmission of vehicle as claimed in claim 1, further comprising:

a speed change command means, which is adapted to output a command value for setting a speed change ratio in the transmission; and a neutral command means, which is adapted to set the rotational center axis of the rolling member to a condition in which the rotational speed of the second rolling member and the rotational speed of the third rotary member are equalized, in case the speed change ratio commanded by the speed change command means can be set by the first transmission mechanism or the second transmission mechanism.

4. The speed change control system for a transmission of vehicle as claimed in claim 1, further comprising:

a tilt angle control means, which is adapted to increase a tilt angle of the rotational center axis of the rolling member until said difference in the rotational speeds becomes smaller than the preset value, and to decrease the tilt angle of the rotational center axis of the rolling member after said difference in the rotational speeds becomes smaller than the preset value.

5. The speed change control system for a transmission of vehicle as claimed in claim 1, further comprising:

a synchronous speed control means, which is adapted to change a change rate of a speed change ratio achieved by tilting the rotational center axis of the rolling member in a manner to reduce said difference in the rotational speeds smaller than the preset value, depending on the situations just after the rotational center axis is started to be tilted, and just before said rotational speeds becomes smaller than the preset value.

6. The speed change control system for a transmission of vehicle as claimed in claim 5, wherein:

the synchronous speed control means includes a means which is adapted to reduce the change rate of the speed change ratio just before said difference in the rotational speeds becomes smaller than the preset value, to be relatively smaller than the change rate of the speed change ratio of just after start tilting the rotational center axis of the rolling member.

7. The speed change control system for a transmission of vehicle as claimed in claim 5, further comprising:

an oil temperature detecting means, which is adapted to detect an oil temperature of the transmission; and wherein the synchronous speed control means includes a means, which is adapted to reduce the change rate of the speed change ratio just before said difference in the rotational speeds becomes smaller than the preset value in case the oil temperature detected by the oil temperature detecting means is relatively low, in comparison with that of the case in which the oil temperature detected by the oil temperature detecting means is relatively high.

8. The speed change control system for a transmission of vehicle as claimed in claim 5, further comprising:

a load detecting means, which is adapted to detect an output torque of a prime mover connected with the transmission; and wherein the synchronous speed control means includes a means, which is adapted to reduce the change rate of the speed change ratio just before said difference in the rotational speeds becomes smaller than the preset value in case the output torque detected by the load detecting means is relatively low, in comparison with that of the case in which the output torque detected by the load detecting means is relatively high.

9. The speed change control system for a transmission of vehicle as claimed in claim 5, further comprising:

a speed detecting means, which is adapted to detect an output speed of the prime mover connected with the transmission; and wherein the synchronous speed control means includes a means, which is adapted to reduce the change rate of the speed change ratio just before said difference in the rotational speeds becomes smaller than the preset value in case the speed detected by the speed detecting means is relatively high, in comparison with that of the case in which the speed detected by the speed detecting means is relatively low.

10. The speed change control system for a transmission of vehicle as claimed in claim 5, further comprising:
   a mode shifting means, which is adapted to select a driving mode where a drive torque of the vehicle is reduced relatively; and
   wherein the synchronous speed control means includes a means, which is adapted to reduce the change rate of the speed change ratio just before said difference in the rotational speeds becomes smaller than the preset value in case the driving mode where the drive torque is reduced relatively is selected, in comparison with that of the case in which the driving mode where the drive torque is reduced relatively is not selected.

11. The speed change control system for a transmission of vehicle as claimed in claim 5, wherein:
   the synchronous speed control means includes a means, which is adapted to reduce the change rate of the speed change ratio just before said difference in the rotational speeds becomes smaller than the preset value in case a speed change ratio set by the geared transmission is relatively large, in comparison with that of the case in which the speed change ratio set by the geared transmission is relatively small.

12. The speed change control system for a transmission of vehicle as claimed in claim 5, further comprising:
   a speed changing rate detecting means, which is adapted to detect a change rate of the speed of the prime mover connected with the transmission; and
   wherein the synchronous speed control means includes a means, which is adapted to reduce the change rate of the speed change ratio just before said difference in the rotational speeds becomes smaller than the preset value in case an increasing rate of the speed of the prime mover detected by the speed changing rate detecting means is relatively high, in comparison with that of the case in which the detected increasing rate of the speed of the prime mover is relatively low.

13. The speed change control system for a transmission of vehicle as claimed in claim 1, wherein:
   the synchronization command means includes a means, which is adapted to increase the tilt angle of the rotational center axis of the rolling member larger than the tilt angle at which said rotational speeds are synchronized, and thereafter return said tilt angle to the angle at which the difference in said rotational speeds becomes smaller than the preset value; and
   the speed change execution means includes a means, which is adapted to shift said one of the switching mechanisms thereby engaging said one of the switching mechanisms with the member to be engaged therewith, when said difference in the rotational speeds becomes smaller than the preset value by returning said tilt angle.

* * * * *